US012645095B2

(12) United States Patent
Momonoi et al.

(10) Patent No.: US 12,645,095 B2
(45) Date of Patent: Jun. 2, 2026

(54) THREE-DIMENSIONAL DISPLAY DEVICE

(71) Applicant: SAMSUNG ELECTRONICS CO., LTD., Suwon-si (KR)

(72) Inventors: Yoshiharu Momonoi, Yokohama (JP); Atsushi Sato, Yokohama (JP); Katsutoshi Sasaki, Yokohama (JP)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/776,753

(22) Filed: Jul. 18, 2024

(65) Prior Publication Data

US 2024/0369851 A1 Nov. 7, 2024

Related U.S. Application Data

(63) Continuation of application No. PCT/KR2023/002048, filed on Feb. 13, 2023.

(30) Foreign Application Priority Data

Mar. 24, 2022 (JP) ................................. 2022-048543
Sep. 26, 2022 (JP) ................................. 2022-152075

(51) Int. Cl.
  *G02B 30/29* (2020.01)
  *G02B 3/00* (2006.01)
  (Continued)

(52) U.S. Cl.
  CPC ............. *G02B 30/29* (2020.01); *G02B 3/005* (2013.01); *G02B 3/08* (2013.01); *G02B 5/02* (2013.01);
  (Continued)

(58) Field of Classification Search
  CPC ...... G02B 3/005; G02B 27/0101; G02B 5/02; G02B 30/27; G02B 3/08; G02B 30/29;
  (Continued)

(56) References Cited

U.S. PATENT DOCUMENTS 8,294,753 B2 10/2012 Jeong et al.
11,483,546 B2 10/2022 Kroon et al.
(Continued)

FOREIGN PATENT DOCUMENTS

JP 2004-287034 A 10/2004
JP 2007-33655 A 2/2007
(Continued)

OTHER PUBLICATIONS

International Search Report (PCT/ISA/210) issued on Jun. 23, 2023 by the International Searching Authority in International Application No. PCT/KR2023/002048.
(Continued)

*Primary Examiner* — Dismery Mercedes
(74) *Attorney, Agent, or Firm* — Sughrue Mion, PLLC

(57) ABSTRACT

A three-dimensional (3D) display device including: a display unit configured to display an image; a display driver configured to display, on the display unit, a plurality of first images based on a depth component of the image and a second image based on a planar component of the image; a first lens array including a plurality of first lens elements provided at a first pitch on a rear side of the display unit; a second lens array including a plurality of second lens elements provided at a second pitch wider than the first pitch of the plurality of first lens elements on a rear side of the first lens array; a plurality of light source assemblies respectively located on rear sides of the plurality of second lens elements and including a plurality of light sources; and a light source driver.

12 Claims, 29 Drawing Sheets

(51) Int. Cl.

| | |
|---|---|
| *G02B 3/08* | (2006.01) |
| *G02B 5/02* | (2006.01) |
| *G02B 27/01* | (2006.01) |
| *G02B 30/27* | (2020.01) |
| *G02B 30/28* | (2020.01) |
| *G02F 1/13357* | (2006.01) |
| *G09G 3/00* | (2006.01) |
| *G09G 3/34* | (2006.01) |
| *G09G 3/36* | (2006.01) |

(52) U.S. Cl.
CPC ......... *G02B 27/0101* (2013.01); *G02B 30/27* (2020.01); *G02B 30/28* (2020.01); *G02F 1/133606* (2013.01); *G09G 3/003* (2013.01); *G09G 3/342* (2013.01); *G09G 3/36* (2013.01); *G09G 2320/0209* (2013.01); *G09G 2320/0233* (2013.01); *G09G 2330/021* (2013.01)

(58) Field of Classification Search
CPC ............... G02B 30/28; G02F 1/133526; G02F 1/133606; G02F 1/133567; G09G 2320/0233; G09G 3/342; G09G 3/003; B29D 11/00278; B29D 11/00298
See application file for complete search history.

(56) References Cited

U.S. PATENT DOCUMENTS

| | | | | |
|---|---|---|---|---|
| 2005/0280783 A1* | 12/2005 | Yamasaki | ............ | H04N 9/3141 348/E5.143 |
| 2008/0239484 A1 | 10/2008 | Fukaishi et al. | | |
| 2010/0027113 A1 | 2/2010 | Shin et al. | | |
| 2011/0157471 A1* | 6/2011 | Seshadri | ............. | H04N 13/161 348/E5.099 |
| 2011/0255170 A1* | 10/2011 | Yamada | ............... | H04N 13/305 359/619 |
| 2012/0147059 A1* | 6/2012 | Chen | ...................... | H04N 13/32 345/102 |
| 2013/0155377 A1* | 6/2013 | Huang | ................. | H04N 13/359 353/7 |
| 2014/0340930 A1* | 11/2014 | Nakagome | ........... | G02B 6/0043 362/606 |
| 2015/0212334 A1* | 7/2015 | Goulanian | ........... | H04N 13/302 353/7 |
| 2017/0336626 A1* | 11/2017 | Hayashi | ............. | G02B 27/0093 |
| 2018/0024628 A1* | 1/2018 | Kim | ..................... | G02B 3/0006 345/156 |
| 2018/0239189 A1* | 8/2018 | Koito | ................ | G02F 1/133512 |
| 2019/0235313 A1* | 8/2019 | Imai | .................. | G02F 1/133504 |
| 2020/0174279 A1 | 6/2020 | Ishihara et al. | | |
| 2021/0203913 A1 | 7/2021 | Kim et al. | | |
| 2024/0114122 A1* | 4/2024 | Momonoi | .............. | H04N 13/32 |

FOREIGN PATENT DOCUMENTS

| | | |
|---|---|---|
| JP | 4095635 B2 | 6/2008 |
| JP | 2012-78583 A | 4/2012 |
| JP | 2014-112147 A | 6/2014 |
| JP | 5760428 B2 | 8/2015 |
| JP | 6791058 B2 | 11/2020 |
| KR | 10-2006-0042869 A | 5/2006 |
| KR | 10-2013-0132062 A | 12/2013 |
| KR | 10-2016-0027166 A | 3/2016 |
| KR | 10-1607901 B1 | 4/2016 |
| KR | 10-2017-0006318 A | 1/2017 |

OTHER PUBLICATIONS

Liu et al., "Time-multiplexed light field display with 120-degree wide viewing angle," Optics Express, vol. 27, No. 24, pp. 35728-35739, Nov. 2019.

* cited by examiner

High-definition field     Depth of field     Display image

Depth area

Low-frequency data    High-frequency data
(Second image)        (First image)

High-definition field     Depth of field     Display image

High-definition area

Low-frequency data    High-frequency data
(Second image)        (First image)

| Field / Angle | Depth Display | 2D Display | Depth Display | 2D Display | Depth Display |
|---|---|---|---|---|---|
| 0° | | | | | |
| 60° | | | | | |

Time

2D Display i

1d

10

81

40

30

50 depth Display ii

THREE-DIMENSIONAL DISPLAY DEVICE

CROSS REFERENCE TO RELATED APPLICATION

This application is a continuation of International Application No. PCT/KR2023/002048, filed on Feb. 13, 2023, in the Korean Intellectual Property Receiving Office, which is based on and claims priority to Japanese Patent Applications No. 2022-048543, filed on Mar. 24, 2022 and No. 2022-152075, filed on Sep. 26, 2022, in the Japanese Patent Office, the disclosures of which are incorporated by reference herein in their entireties.

BACKGROUND

1. Field

This disclosure relates to a three-dimensional (3D) display device and a 3D display method.

2. Description of Related Art

Technology for displaying three-dimensional (3D) images has been proposed in related art (e.g., see Japanese Patent No. 5760428 which is Patent Document 1). In particular, light field technology has attracted attention as technology for displaying 3D images (e.g., see 'Boyang Liu, Xinzhu Sang, Xunbo Yu, Xin Gao, Li Liu, Chao Gao, Peiren Wang, Yang Le, and Jingyan Du, "Time-multiplexed light field display with 120-degree wide viewing angle," Opt. Express (2019) 27, 35728-35739' which is Non-Patent Document 1).

SUMMARY

Provided is a three-dimensional (3D) display device and a 3D display method which may appropriately display a clearer 3D image while ensuring depth.

Additional aspects will be set forth in part in the description which follows and, in part, will be apparent from the description, or may be learned by practice of the presented embodiments.

According to an aspect of the disclosure, a three-dimensional (3D) display device may include: a display unit configured to display an image; a display driver configured to display, on the display unit, a plurality of first images based on a depth component of the image and a second image based on a planar component of the image; a first lens array including a plurality of first lens elements provided at a first pitch on a rear side of the display unit; a second lens array including a plurality of second lens elements provided at a second pitch wider than the first pitch of the plurality of first lens elements on a rear side of the first lens array; a plurality of light source assemblies respectively located on rear sides of the plurality of second lens elements and including a plurality of light sources; and a light source driver configured to control the plurality of light source assemblies to illuminate the plurality of first images and the second image.

A position of the display unit may be greater than or equal to 1.9 times and less than 2.1 times a focal length of the first lens array from the first lens array.

At least one light source assembly of the plurality of light source assemblies may include: a first light source provided in a vertical direction of a pixel array included in the display unit; and a second light source and a third light source spaced apart from each other with the first light source therebetween.

The first light source, the second light source, and the third light source may be radially adjacent at a first distance from a principal point of a corresponding second lens element of the second lens array.

Based on the light source driver driving the plurality of light source assemblies, a number of light sources, among the plurality of light sources included in the plurality of light source assemblies, used to illuminate the second image may be greater than a number of light sources used to illuminate one of the plurality of first images.

At least some of the plurality of first images have a different angle range in a display direction, where at least some of the plurality of light sources are provided at different positions corresponding to the angle range.

The display driver may be configured to display the plurality of first images through field division, where, based on a field of a first image being switched, the light source driver is configured to turn on a light source according to an angle range corresponding to the first image after the field is switched.

At least some of the plurality of light sources may include a light source block along a vertical scanning direction of the display unit, where the display driver is configured to switch the first image displayed on the display unit in a process of vertical scanning, where the light source driver is configured to turn on and turn off the light source block included in the at least some of the plurality of light sources in the vertical scanning direction, and where the display driver includes a synchronization module configured to synchronize a position of the vertical scanning of the display unit with a vertical position of the light source block that is turned on or turned off.

The display driver may be configured to display the plurality of first images and the second image on the display unit through area division, and display the first image corresponding to each angle range through the field division, in an area in which the plurality of first images are displayed, where based on the light source driver driving the plurality of light source assemblies through area control, a number of light sources, among the plurality of light sources included in the plurality of light source assemblies, used to illuminate the second image is greater than a number of light sources used to illuminate one of the plurality of first images.

The display driver may be configured to display the plurality of first images in a plurality of fields and display the second image in one field.

Ridges of the second lens array may be provided along a vertical direction of a pixel array of the display unit, where ridges of the first lens array are inclined at a predetermined angle with respect to the vertical direction.

The display device may further include: a diffusion sheet between the first lens array and the display unit and configured to diffuse incident light, where a position of the diffusion sheet is 0.9 times to 1.1 times a focal length of the first lens array from the first lens array.

The diffusion sheet may be an anisotropic diffusion sheet configured to diffuse more incident light in a ridge direction of the first lens array than in a direction perpendicular to ridges of the first lens array.

At least some of the plurality of light source assemblies may include a light blocking wall configured to inhibit incidence of light from an adjacent light source assembly to a corresponding second lens element.

The display device may further include: a shielding plate provided on a surface of the first lens array and including a slit configured to shield light transmitted through a peripheral portion of each first lens element included in the first lens array and transmit light through a central portion of the each first lens element.

BRIEF DESCRIPTION OF DRAWINGS

The above and other aspects, features, and advantages of certain embodiments of the present disclosure will be more apparent from the following description taken in conjunction with the accompanying drawings, in which:

FIG. 30 is a top view illustrating a cylindrical lens array seen through a diffusion sheet, in a 3D display device, according to an embodiment;

FIG. 31 is a view illustrating 2-field display of a depth of field and a high-definition field, in a 3D display device, according to an embodiment; and FIG. 32 is a view illustrating field control including a depth of field and a high-definition field, in a 3D display device, according to an embodiment.

DETAILED DESCRIPTION

Figure 1:
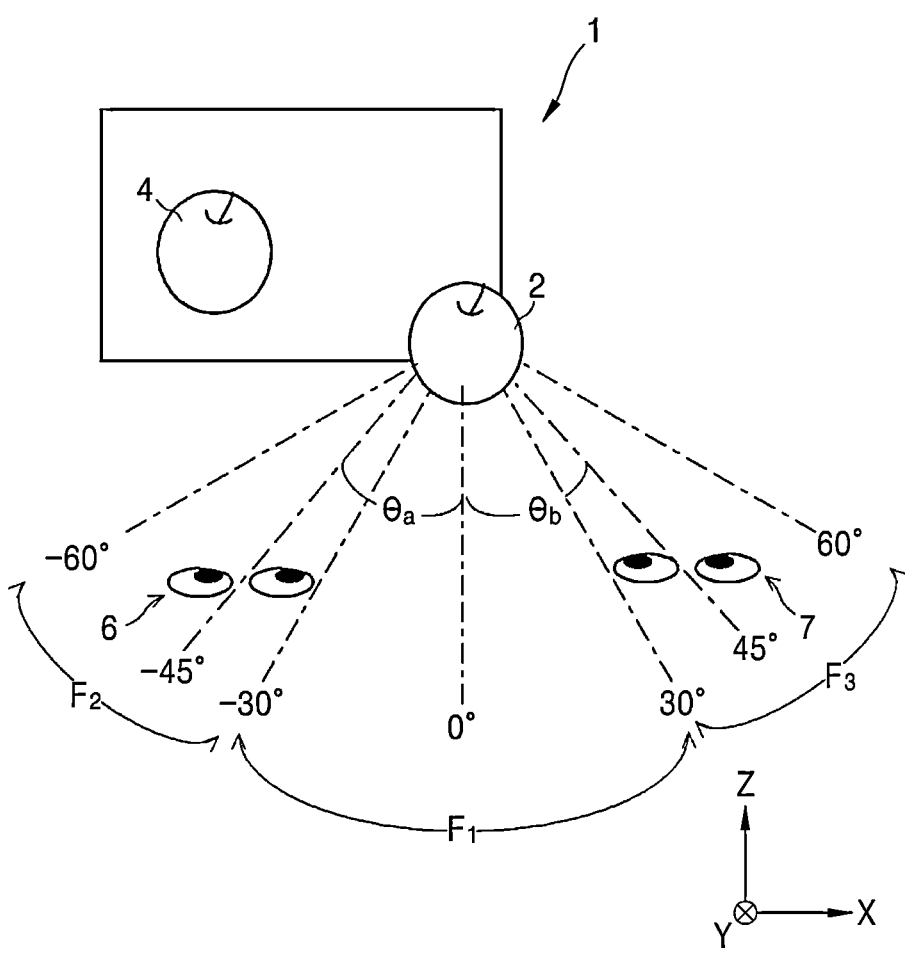
FIG. 1 is a view for describing an observation method, according to an embodiment.

Hereinafter, example embodiments of the disclosure will be described in detail with reference to the accompanying drawings. The same reference numerals are used for the same components in the drawings, and redundant descriptions thereof will be omitted. The embodiments described herein are example embodiments, and thus, the disclosure is not limited thereto and may be realized in various other forms. It is to be understood that singular forms include plural referents unless the context clearly dictates otherwise. The terms including technical or scientific terms used in the disclosure may have the same meanings as generally understood by those skilled in the art.

When a first element is "on ~" or "over" a second element, it may include a case where the first element contacts the second element and is directly located on the top, bottom, left, or right of the second element, and a case where the first element does not contact the second element and is located on the top, bottom, left, or right of the second element with a third element therebetween. When a part "includes" an element, another element may be further included, rather than excluding the existence of the other element, unless otherwise described.

The use of the terms "a" and "an," and "the" and similar referents in the context of describing the present disclosure is to be construed to cover both the singular and the plural. The steps of all methods described herein may be performed in any suitable order unless otherwise indicated herein or otherwise clearly contradicted by context, and are not limited to the described order.

Also, the term " . . . unit" or " . . . module" refers to a unit that performs at least one function or operation, and the unit may be implemented as hardware or software or as a combination of hardware and software.

Also, lines or members connecting elements illustrated in the drawings are merely illustrative of functional connections and/or physical or circuit connections. In an actual device, the connections between elements may be represented by various functional connections, physical connections, or circuit connections that are replaceable or added.

The expression "at least one" preceding a list of elements is to limit the entire lit of elements and does not limit individual elements of the list. For example, the expression "at least one of A, B, and C" or "at least one of A, B, or C" may indicate only A, only B, only C, or a combination thereof (e.g., ABC, AB, BC, or AC).

When "about" or "substantially" is used in connection with a numerical value, the relevant numerical value may include a manufacturing or operational tolerance (e.g., ±10%) around the stated numerical value. Also, when the term "generally" or "substantially" is used in connection with a geometric shape, it may be intended that precision of the geometric shape may not be required and latitude for the shape is within the scope of the disclosure.

It will be understood that although the terms "first," "second," etc. may be used herein to describe various elements, these elements should not be limited by these terms. These terms are used only to distinguish one element from another.

The use of any and all examples or exemplary language provided herein is intended merely to better describe the disclosure and does not pose a limitation on the scope of the disclosure unless otherwise claimed.

Technology for displaying three-dimensional (3D) images (hereinafter, referred to as 3D display technology) has been proposed. 3D display technology may be classified into a method using glasses and a method not using glasses.

The method using glasses has problems such as the inconvenience of wearing glasses and distortion according to an observation position.

The method not using glasses includes a horizontal parallax method and a method of obtaining both horizontal and vertical parallax. In a related art, Japanese Patent No. 5760428, which is Patent Document, describes technology of switching a shutter in a backlight that combines the shutter, a prism, and a lenticular sheet and sending light of a backlight source to each of the left and right eyes in a time-divisional manner. Accordingly, high-definition 3D display may be possible without glasses. However, there is a problem in that, because the shutter is used, the efficiency of light may be reduced and natural motion parallax may not be obtained in a wide range.

A method of a 3D display device that realizes 3D display without glasses will be described with reference to FIGS. 19 to 24.

In the following description, a direction (depth direction) perpendicular to a main surface of a display unit of a 3D display device is referred to as a Z-axis direction, a left-right direction of a screen parallel to the main surface of the display unit is referred to as an X-axis direction, and an up-down direction (referred to as a vertical scanning direction) of the screen parallel to the main surface of the display unit is referred to as a Y-axis direction.

Figure 19:
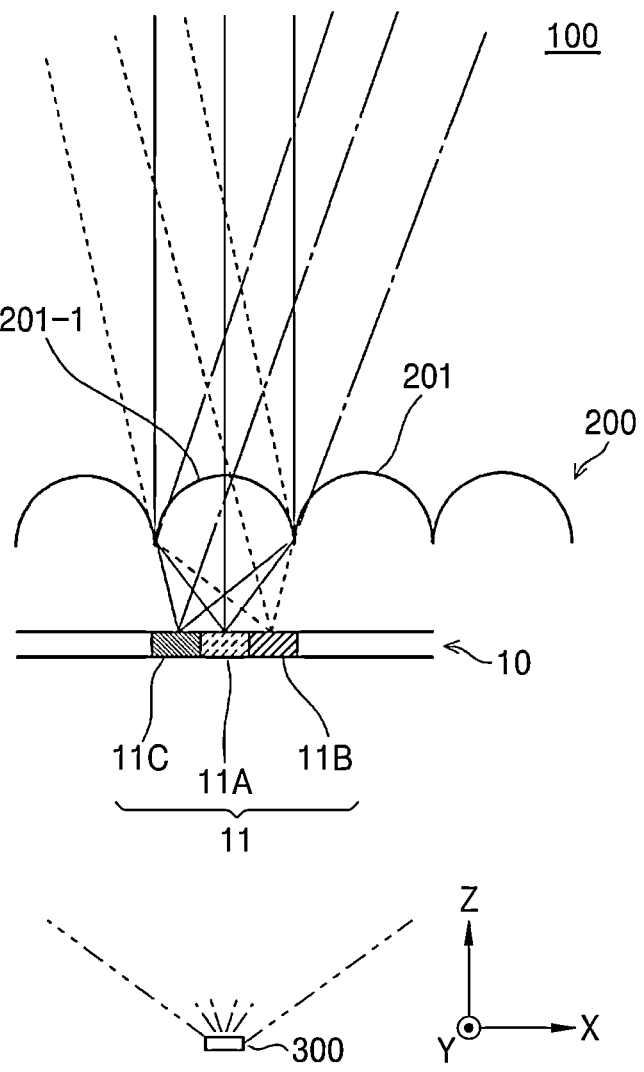
FIG. 19 is a view for describing a display principle of a 3D display device, according to an embodiment.
Figure 20:
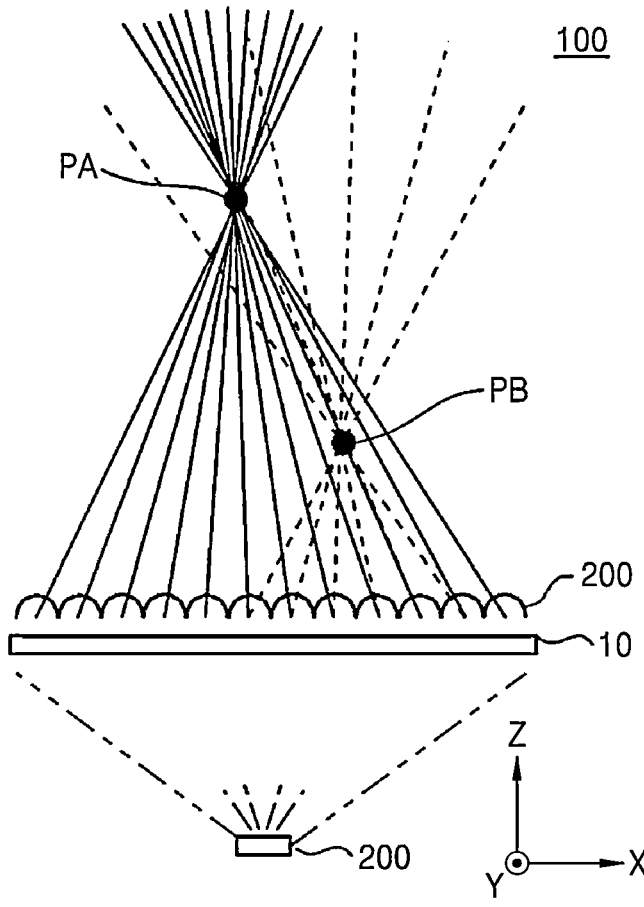
FIG. 20 is a view for describing a display principle of a 3D display device, according to an embodiment.
Figure 21:
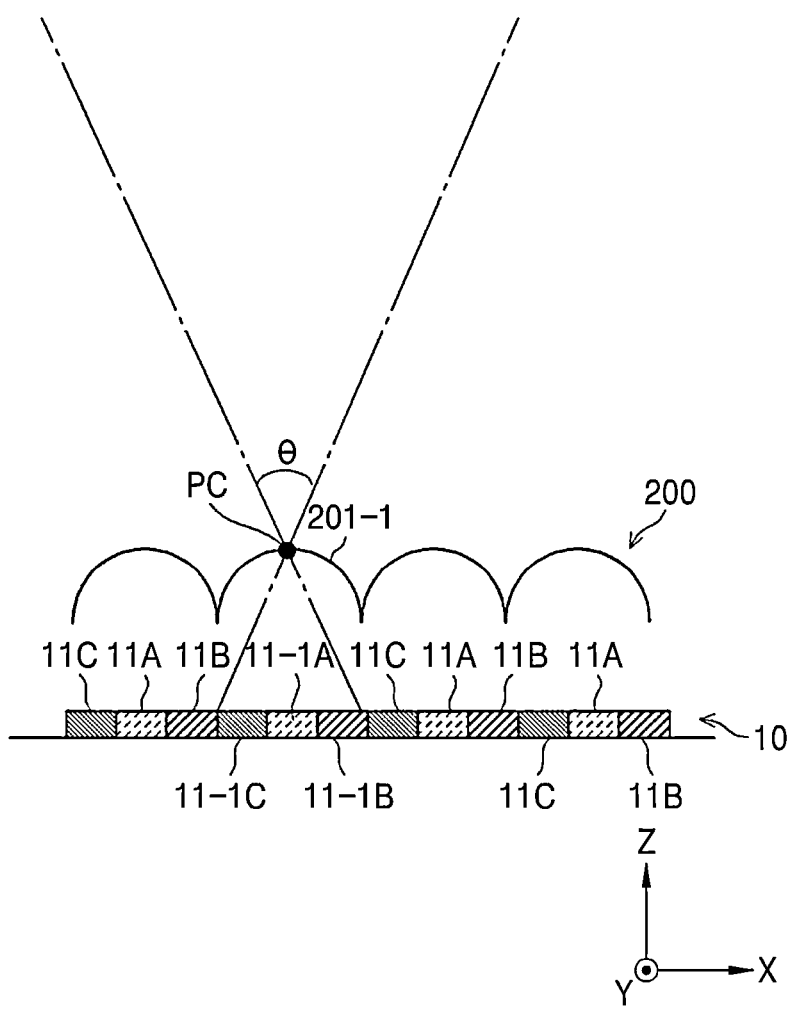
FIG. 21 is a view for describing a display principle of a 3D display device, according to an embodiment.

FIGS. 19 to 21 are views for describing a display principle of a 3D display device 100, according to an embodiment.

The 3D display device 100 is a ray reproduction type 3D display device. For example, the 3D display device 100 is a 3D display such as an integral photography display or a light field display. In detail, the 3D display device 100 may display a multi-view image group and generate binocular parallax of a user or motion parallax occurring when the user moves a viewpoint so that a user perceives a 3D image. The 3D display device 100 may include a display unit 10, a lens array 200, and a light source 300.

A plurality of lens elements 201 are arranged in the lens array 200. The lens element 201 is also referred to as an exit pupil and controls a ray exit direction of an element image displayed on the display unit 10.

The display unit 10 is a liquid crystal display (LCD) or an organic light-emitting diode (OLED), and has a quadrangular display area and includes a plurality of pixel arrays 11 (display pixels). For example, the display unit 10 may include pixels 11A, 11B, and 11C. The pixels 11A, 11B, and 11C may be referred to as a pixel array. As shown in FIG. 19, in the 3D display device 100 according to an embodiment, because the lens element 201 is located over the pixel array 11, light from the pixel array 11 may have directivity. For example, when a distance between the pixel array 11 and a principal point of the lens element 201 is a focal length of the lens element 201, light from the pixel array 11 may be emitted as parallel light through the lens element 201.

In an example of FIG. 19, light from the pixel 11A at the center, under a lens element 201-1, may be emitted upward, as marked by a solid line. Also, light from the pixel 11B on the right may be emitted in an upper-left direction, as marked by a broken line. Also, light from the pixel 11C on the left may be emitted in an upper-right direction, as marked by a dash-dotted line. As such, light from the pixel array 11 under the lens element 201 may be expressed as light in a certain direction.

As shown in FIG. 19, because light from the pixel array 11 has directivity, as shown in FIG. 20, one point having depth may be expressed by a set of rays for each pixel array 11. For example, a point PA may be a point where light from the pixels 11A under respective lens elements 201 is collected. A point PB may be a point where light from the pixels 11B under respective lens elements 201 is collected. In addition, the pixels 11A under the respective lens elements 201 correspond to the same position of a photographed object, and the position is reproduced by the point PA. Likewise, the pixels 11B under respective lens element 201 correspond to the same position of the photographed object, and the position is reproduced by the point PB. As such, the 3D display device 100 expresses a point having a 3D depth as light condensed at one point in a space.

The number of pixel arrays 11 under each lens element 201 is finite. In an example of FIG. 21, for explanation, it is assumed that there is the pixel array 11 including three pixels, e.g., the pixels 11A, 11B, and 11C, under each lens element 201. For example, there is the pixel array 11 including three pixels, for example, pixels 11A-1, 11B-1, and 11C-1, under the lens element 201-1. Also, in the lens element 201 near the lens element 201-1, a ray is expressed by the pixel array 11 under the lens element 201. Accordingly, in one lens element 201-1, a ray is expressed within a range of an element image right under the lens element 201-1. That is, a range of a point that may be expressed by the lens element 201-1 is an angle range (viewing angle θ) determined by a principal point PC of the lens element 201-1 and a width of an element image. Outside the viewing angle θ, light appears due to an element image under the lens element 201 near the lens element 201-1. Accordingly, an intended 3D image may not be represented.

Accordingly, an overlapping range of display ranges represented through the lens element 201 from the element image is an observable range (field of view).

Figure 22:
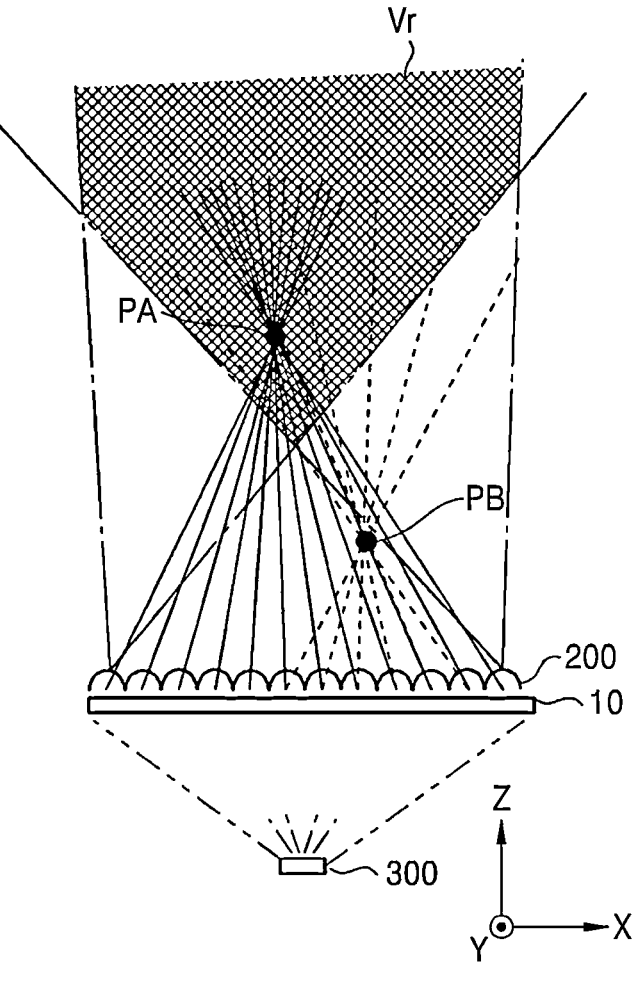
FIG. 22 is a view for describing a viewing zone of a 3D display device, according to an embodiment.

FIG. 22 is a view for describing a viewing zone of the 3D display device 100, according to an embodiment. In an example of FIG. 22, a hatched region Vr represents a viewing zone corresponding to an overlapping display area from corner to corner of a screen of the display unit 10. A viewing angle at both ends of the screen is designed to be slightly inward, indicating that light from the both ends may be observed in the hatched region. A viewing angle within the screen continuously changes within the screen, and because all rays within the screen may be observed in an area where rays from the both ends intersect, the region Vr becomes a display range.

Next, with reference to FIGS. 23 and 24, a relationship between a depth amount of a 3D image displayed by the 3D display device 100 and a spatial frequency will be described.

Figure 23:
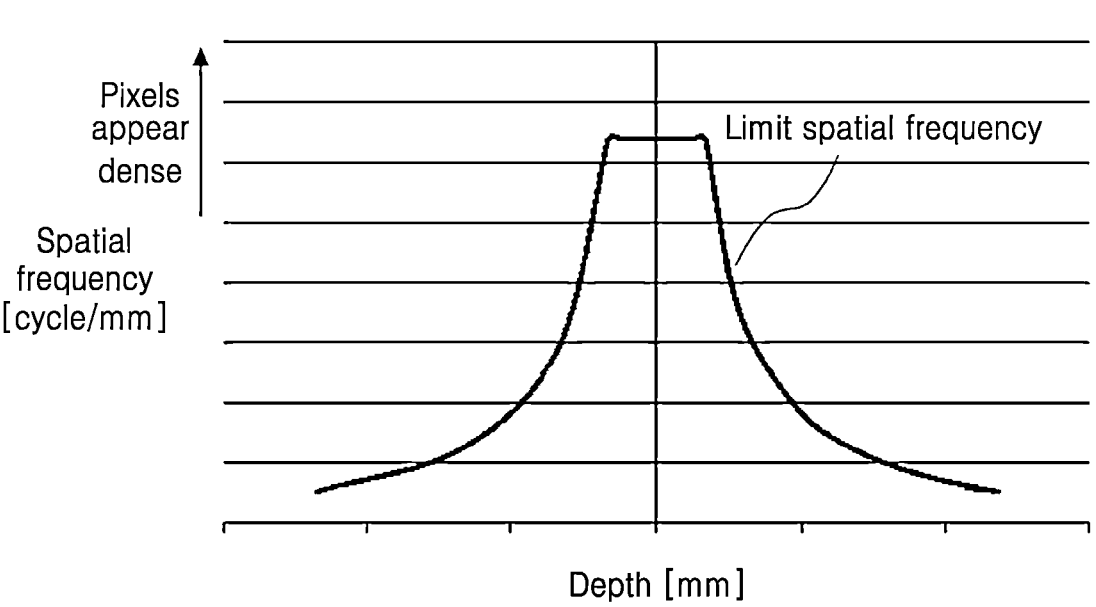
FIG. 23 is a view illustrating a relationship between a depth of a 3D display device and a limit spatial frequency, according to an embodiment.

FIG. 23 is a view illustrating a relationship between a depth of the 3D display device 100 and a limit spatial frequency, according to an embodiment. As shown in FIG. 23, in a 3D image displayed by the 3D display device 100, a spatial frequency that may be displayed becomes sparse as a position where a pixel constituting the 3D image is displayed is away from the display unit 10. This is because a pixel constituting an element image has a width. Here, when a pixel width is PP, a distance between the lens element 201 and a pixel displayed on the display unit 10 (hereinafter, referred to as a 'distance between a lens and a pixel') is g, and a spatial frequency is v (cycle/mm), a depth amount DL of a displayed limit may be expressed as in Equation 1.

[Equation 1]

$$D_L = \frac{g}{2vP_p} \quad (1)$$

A 3D image may not be displayed with a spatial frequency denser than a lens width of the lens element 201 of the lens array 200. Accordingly, in a portion close to the display unit 10, a spatial frequency of a 3D image becomes a spatial frequency determined by a lens width of the lens element 201. When a 3D image is to be displayed with a denser spatial frequency at a depth far from the display unit 10 (a depth where a spatial frequency is not limited by a lens width), the distance g between a lens and a pixel may be increased.

Figure 24:
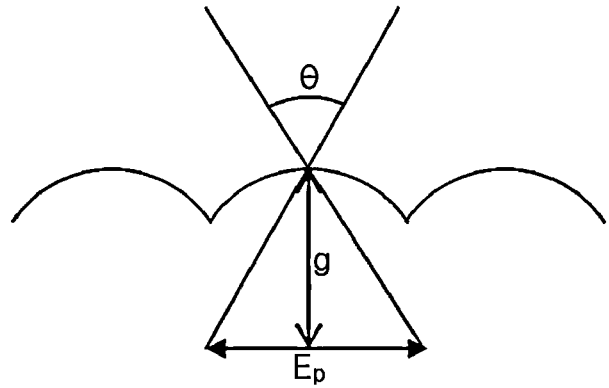
FIG. 24 is a view for describing a viewing angle and a distance between a lens and a pixel of a 3D display device, according to an embodiment.

FIG. 24 is a view for describing a viewing angle and a distance between a lens and a pixel of the 3D display device 100, according to an embodiment. As shown in FIG. 24, a relationship between an element image width Ep, a viewing angle θ, and a distance g between a lens and a pixel may be expressed as in Equation 2.

[Equation 2]

$$\theta = 2\tan^{-1}\left(\frac{E_p}{2g}\right) \quad (2)$$

As shown in Equation 2, assuming that the element image width Ep is the same, when the distance g between a lens and a pixel increases, the viewing angle θ decreases. When the element image width Ep increases, a lens width increases and thus, the spatial frequency v becomes sparse. That is, the depth amount DL, the viewing angle θ, and the spatial frequency v that is maximized have a trade-off relationship. Accordingly, in a ray reproduction type 3D device with motion parallax in a wide range, it is required to realize 3D display that is clearer than a resolution reaching its limit.

In a related art, Non-Patent Document 1 discloses technology for realizing 3D display without glasses by using time division, like in Patent Document 1. The technology disclosed in Non-Patent Document 1 may expand a display range of multiple parallax directions by using a backlight of a cylindrical lens that switches multiple light sources in time division and a lenticular sheet on a front surface of an LCD. However, there was a problem in that a resolution of a displayed field decreased to 1/the number of parallaxes.

At least one of the following embodiments is to solve the above problems.

A 3D display device according to at least one of the following embodiments includes a lenticular sheet between a lens array and a display unit and switches a plurality of light sources through time division. Accordingly, a display range of a plurality of parallax directions may be expanded. Also, a 3D display device according to at least one of the embodiments may implement a high-definition display method of expanding an emission range of a light source in addition to a parallax display method. Also, a 3D display device according to at least one of the embodiments appropriately displays a clearer 3D image while ensuring depth by optimizing display content for each area or field by varying an illumination method for each area or field of a display unit.

Embodiment 1

First, Embodiment 1 of an embodiment will be described. First, FIG. 1 is a view for describing an observation method in two types of display methods, according to an embodiment.

(Observation Method Using Parallax Display Method)

In a parallax display method, a 3D display device 1 displays a 3D image 2. As described above, a viewing zone is limited in the parallax display method. Users 6 and 7 may observe the 3D image 2 displayed by the 3D display device 1 in a comfortable position within a viewing zone.

The 3D image 2 includes a set of rays 3 from the 3D display device 1. A human being perceives depth due to binocular parallax that occurs when looking at an object with both eyes, that is, a difference between retinal images of the left and right eyes. Also, a human being perceives depth according to motion parallax, that is, a change in a retinal image caused by relative movement of an observer and an object. Accordingly, the users 6 and 7 may observe the 3D image 2.

The users 6 and 7 may observe different 3D images 2 from respective positions as they move their heads left and right within the viewing zone. Although the users 6 and 7 are shown on the left and right in FIG. 1, because the users 6 and 7 observe the 3D image from different directions, the users 6 and 7 may observe different 3D images. For example, when an apple is displayed as a 3D image, the user 6 may observe a right surface of the apple, and the user 7 may observe a left surface of the apple.

Here, an angle at which a user observes the 3D image 2 is referred to as an 'observation angle'. The observation angle is an angle formed between the Z-axis direction and a direction in which a user observes (however, an absolute value is 90° or less). An observation angle of a user in a positive Z-axis direction with respect to the 3D image 2 is 0°, an observation angle $\theta_a$ of the user 6 is −45°, and an observation angle $\theta_b$ of the user 7 is 45°.

Because a direction in which a user observes the 3D image 2 is opposite to a direction in which the 3D image 2 is displayed (a display direction of the 3D image 2) to the user 1, an observation angle is also referred to as a 'display angle'. A display angle is an angle formed between the Z-axis direction and a display direction of a 3D image (however, an absolute value is 90° or less).

Also, in Embodiment 1, the 3D display device 1 displays an element image of a depth area for each display angle range in time division (field division), in order to express a depth of the 3D image 2. For example, the 3D display device 1 divides and displays fields F1, F2, and F3. The field F1 is a field that displays the 3D image 2 with a display angle range of –30° to 30°. The field F2 is a field that displays the 3D image 2 with a display angle range of –60° to –30°. The field F3 is a field that displays the 3D image 2 with a display angle range of 30° to 60°. By repeating the three types of fields at high speed, a user with an observation angle of –60° to 60° may observe the 3D image 2.

A display direction corresponding to a central display angle in allocated display angle ranges is referred to as a main display direction. When a display angle range is –30° to 30°, a main display direction is a display direction with a display angle of 0°. When a display angle range is –60° to –30°, a main display direction is a direction with a display angle of –45°. When a display angle range is 30° to 60°, a main display direction is a direction with a display angle of 45°.

(Observation Method Using High-Definition Display Method)

In a high-definition display method, the 3D display device 1 displays a two-dimensional (2D) image 4 in the positive Z-axis direction.

The users 6 and 7 perceive the 2D image 4 displayed on the 3D display device 1 as a 2D image. Accordingly, the observed 2D image is the same regardless of an observation angle.

Embodiment 1 is characterized in that the 3D display device 1 divides an emission area of a light source into a plurality of areas and allows selection of a parallax display method or a high-definition display method for each area. As such, a different display method for each area is referred to as 'area division', and performing display driving and light source driving according to each area is referred to as 'area control'.

The 3D display device 1 displays the 3D image 2 in an area to which a parallax display method is applied.

The area to which the parallax display method is applied is referred to as a depth area. The 3D display device 1 displays the 2D image 4 in an area to which a high-definition display method is applied. The area to which the high-definition display method is applied is referred to as a high-definition area. Hereinafter, the 3D image 2 and the 2D image 4 may be collectively referred to as a display image or simply an image.

Figure 2:
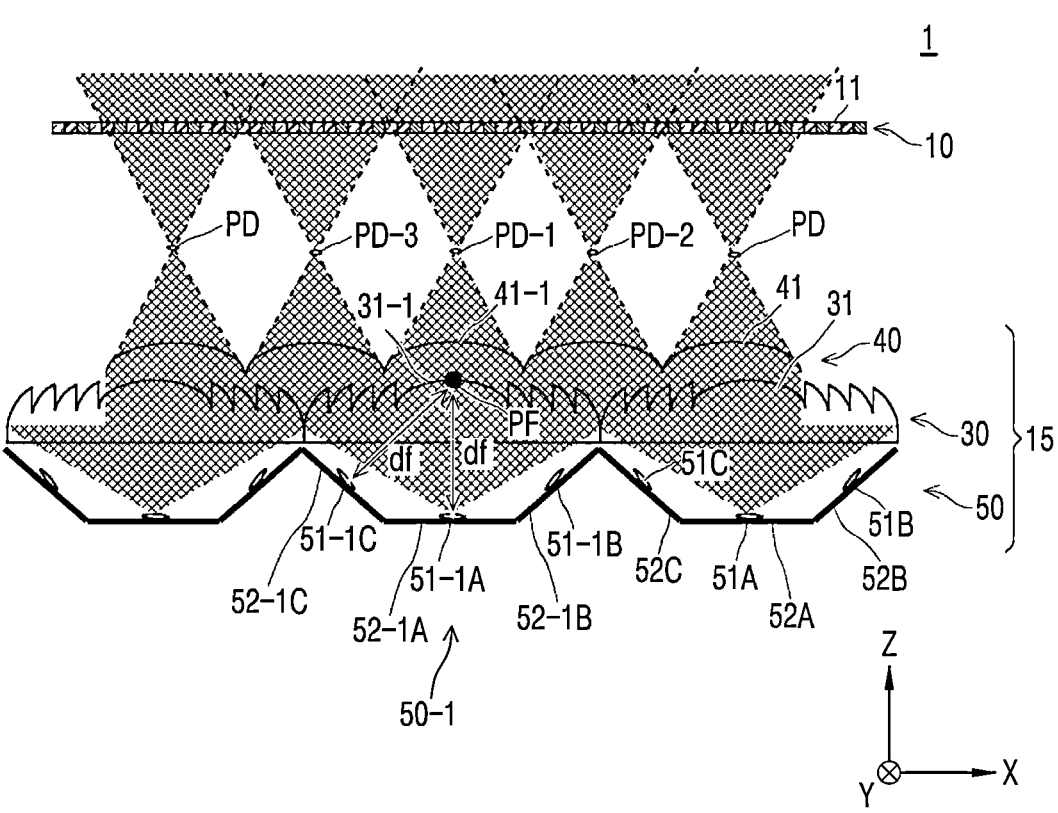
FIG. 2 is a schematic cross-sectional view illustrating a three-dimensional (3D) display device, according to an embodiment.
Figure 3:
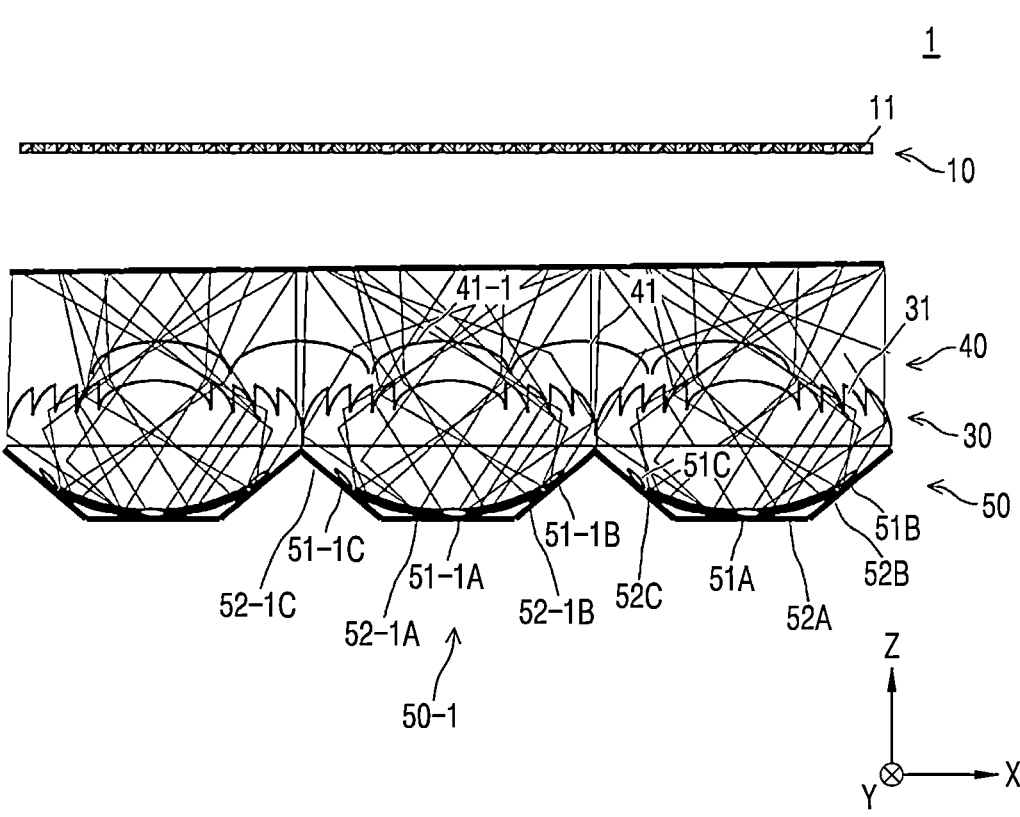
FIG. 3 is a schematic cross-sectional view illustrating a 3D display device, according to an embodiment.

Next, a configuration of the 3D display device 1 that performs the above two types of display methods will be described with reference to FIGS. 2 and 3. FIGS. 2 and 3 are schematic cross-sectional views illustrating the 3D display device 1 according to Embodiment 1.

FIG. 2 is a view illustrating the 3D display device 1 when a parallax display method is applied, according to an embodiment. The 3D display device 1 further includes a light source controller 15 in addition to the display unit 10.

When a parallax display method is applied, the display unit 10 displays a plurality of first images for allowing a user to recognize a depth component (the 3D image 2) of a display image (or an image). A first image is a 2D element image obtained by synthesizing an image corresponding to a display angle range of a field corresponding to the first image, from among multi-view images. In a displayed first image, a display direction of a corresponding display image is different for each field.

A multi-view image is an image obtained by photographing a subject from different viewpoints, and may include an image generated by computer graphics (CG).

The light source controller 15 is a member for controlling an exit direction of a ray. The light source controller 15 may include a lenticular sheet 40, a cylindrical lens array 30, and a plurality of light source units 50.

The lenticular sheet 40 is referred to as a first lens array. The lenticular sheet 40 is located on a rear side of the display unit 10. The lenticular sheet 40 may include a plurality of first lens elements 41 arranged at a certain pitch. The first lens element 41 is an exit pupil, also referred to as a first cylindrical lens. The first lens element 41 has a semi-cylindrical shape with a circumference cut off on a plane parallel to a generatrix. In Embodiment 1, the first lens element 41 is arranged so that an extension direction of a ridge, that is, an axial direction of the semi-cylindrical shape, is substantially parallel to the Y-axis direction.

The cylindrical lens array 30 is also referred to as a second lens array. The cylindrical lens array 30 is located on a rear side of the lenticular sheet 40.

The cylindrical lens array 30 may include a plurality of second lens elements 31 31-1, etc. arranged at a pitch wider than the pitch of the first lens element 41 included in the lenticular sheet 40. In other words, the first lens elements 41 are densely arranged, and the second lens elements 31 are sparsely arranged. The second lens element 31 is an exit pupil, also referred to as a second cylindrical lens. The second lens element 31 functions as a collimator for converting incident light into parallel light. Although the second lens element 31 of FIG. 1 is a Fresnel lens in which a plurality of fine saw-shaped protrusions are formed on both ends of a surface of the semi-cylindrical shape in the X-axis direction, the saw-shaped protrusions may be omitted. In addition, a thickness of a lens may be reduced by using a Fresnel lens.

Each of the plurality of light source units 50 is located on a rear side of each second lens element 31 included in the cylindrical lens array 30. Each light source unit 50 may include a plurality of light sources 51A, 51B, and 51C. For example, each light source unit 50 includes a plurality of linear light sources 51A, 51B, and 51C and a light blocking wall 52A, 52B, and 52C provided to correspond to each linear light source 51A, 51B, 51C. As shown in the illustrations, the plurality of light source units may be denoted as 50, 50-1, etc. respectively corresponding with each second lens element 31, 31-1, etc. along the horizontal direction of the cylindrical lens array 30, Moreover, each of the plurality of light source units 50, 50-1, etc. may include corresponding linear light sources 51, 51-1, etc. and light blocking walls 52, 52-1, etc. Throughout this specification, the light source units 50 may also be referred to as a light source assembly.

The linear light source 51 is referred to as a first light source. The linear light source 51 is, for example, an LED. The linear light source 51 extends along a vertical direction of the pixel array 11 of the display unit 10, that is, along the Y-axis direction. Each linear light source 51A, 51B, and 51C included in one light source unit 50 is provided to correspond to an angle range of a different display direction (or a display angle range). In detail, in a plurality of light source units 50, 50-1, etc., the linear light sources 51A, 51B, and 51C may be arranged at certain intervals in a horizontal direction of the pixel array 11 of the display unit 10, that is, in the X-axis direction. Also, as shown in FIG. 2, each of the linear light sources 51A, 51B, and 51C is radially adjacent at a certain distance df from a principal point PF of the second lens element 31. When the linear light sources 51A, 51B, and 51C are arranged in this way, the effect of spherical aberration may be minimized.

In an example, the 3D display device 1 turns on one linear light source 51 in each field from among the linear light sources 51A, 51B, and 51C included in each light source unit 50. As shown in FIG. 2, light emitted from a linear light source 51-1A is converted to be parallel to the positive Z-axis direction in a second lens element 31-1 of the cylindrical lens array 30. The light converted into parallel light is condensed at a point PD-1 by a first lens element 41-1 included in the lenticular sheet 40. The light condensed at the point PD-1 is diffused toward the positive Z-axis direction and illuminates the display unit 10 located in the positive X-axis direction more than the point PD-1.

Accordingly, a point PD performs the same function as the point PC that is a principal point of the lens element 201 of FIG. 21. The point PD may be a virtual light source.

The display unit 10 may be located at a position about twice a focal length of the lenticular sheet 40 from the lenticular sheet 40. About twice may be twice or may be 1.9 times to 2.1 times. When the display unit 10 is arranged in this way, a different pixel is illuminated according to an observation direction, from a relationship between condensed light and a pixel. In other words, a pixel has directivity.

When a first image is illuminated by one linear light source 51, the 3D display device 1 may display the first image at a resolution corresponding to a pitch of the first lens element 41 of the lenticular sheet 40.

In general, a width of an LED serving as a light source is greater than that of the pixel array 11, and ray expansion when light is converted into parallel light tends to be increased. Accordingly, ray expansion may be relatively reduced by sparsely arranging the second lens elements 31 of the cylindrical lens array 30 and increasing a focal length. Accordingly, a width of the point PD condensed by the first lens element 41 of the lenticular sheet 40 may be reduced. As a result, cross-talk of a display image may be reduced.

FIG. 3 is a view illustrating the 3D display device 1 when a high-definition display method is applied, according to an embodiment. In FIG. 3, an arrangement of elements of the 3D display device 1 is the same as that in FIG. 2, but a type of image displayed on the display unit 10, an illumination manner of a light source, and a traveling state of light are different from those in FIG. 2.

When a high-definition display method is applied, the display unit 10 of the 3D display device 1 displays at least one second image for allowing a user to recognize a planar component (the 2D image 4) of a 3D image. The second image is a 2D image.

The 3D display device 1 turns on a second light source included in one light source unit 50 in the high-definition display method. The second light source has a wider emission width than the first light source. In Embodiment 1, the 3D display device 1 increases the number of linear light sources 51 that are turned on from among the linear light sources 51 included in one light source unit 50 to be greater than the number of linear light sources 51 that are turned on in a parallax display method. For example, the 3D display device 1 simultaneously turns on three linear light sources 51A, 51B, and 51C from among the linear light sources 51 included in each light source unit 50. The three linear light sources 51A, 51B, and 51C may be second light sources.

Accordingly, a plurality of linear light sources 51 function as a surface light source that illuminates a wider area. When illuminated with a surface light source, a wide area is illuminated, without concentrating light on a single point, on a focal plane F of the second lens element 31 of the cylindrical lens array 30. Accordingly, because all pixels are equally illuminated, all pixels may be observed from any observation direction. In this case, the 3D display device 1 may display a second image at a display resolution of the display unit 10.

In addition, even when each light source unit 50 of the 3D display device 1 includes a surface light source different from the linear light source 51, the 3D display device 1 may turn on the surface light source as a second light source in the high-definition display method.

The 3D display device 1 may display an image with high definition and depth by combining the two illumination methods described above for each area.

Figure 4:
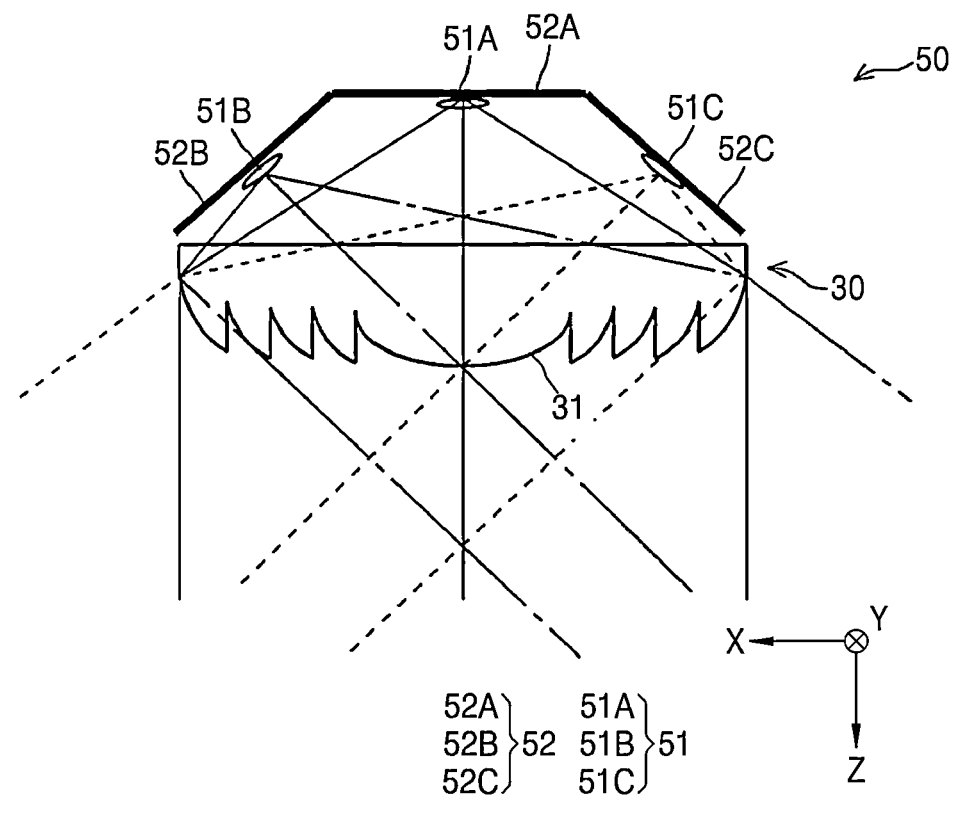
FIG. 4 is a cross-sectional view illustrating a second lens element and a light source unit corresponding to each other, according to an embodiment.

FIG. 4 is a cross-sectional view illustrating the second lens element 31 and the light source unit 50 corresponding to each other in Embodiment 1. As shown in FIG. 4, the second lens element 31 and the light source unit 50 corresponding to each other constitute a system closed by the light blocking wall 52.

The light blocking wall 52 of the light source unit 50 may be formed of a material that blocks light and may prevent light from entering from the outside. The light blocking wall 52 of the light source unit 50 also functions as a member supporting the plurality of linear light sources 51. The light blocking wall 52 supports the linear light source 51 so that an optical axis of the linear light source 51 is directed in a corresponding main display direction.

A light blocking wall 52A is arranged along the X-axis direction, as shown in the cross-sectional view. The light blocking wall 52A supports the linear light source 51A whose display angle in a main display direction is 0°. An end of the light blocking wall 52A in a positive X-axis direction is connected to a light blocking wall 52B, and an end in a negative X-axis direction is connected to a light blocking wall 52C. The light blocking wall 52B is inclined at 45° from the X-axis direction, as shown in the cross-sectional view. The light blocking wall 52B supports the linear light source 51B whose display angle in a main display direction is −45°. A light blocking wall 52C is inclined at −45° from the X-axis direction, as shown in the cross-sectional view. The light blocking wall 52C supports the linear light source 51C whose display angle in a main display direction is 45°.

Figure 5:
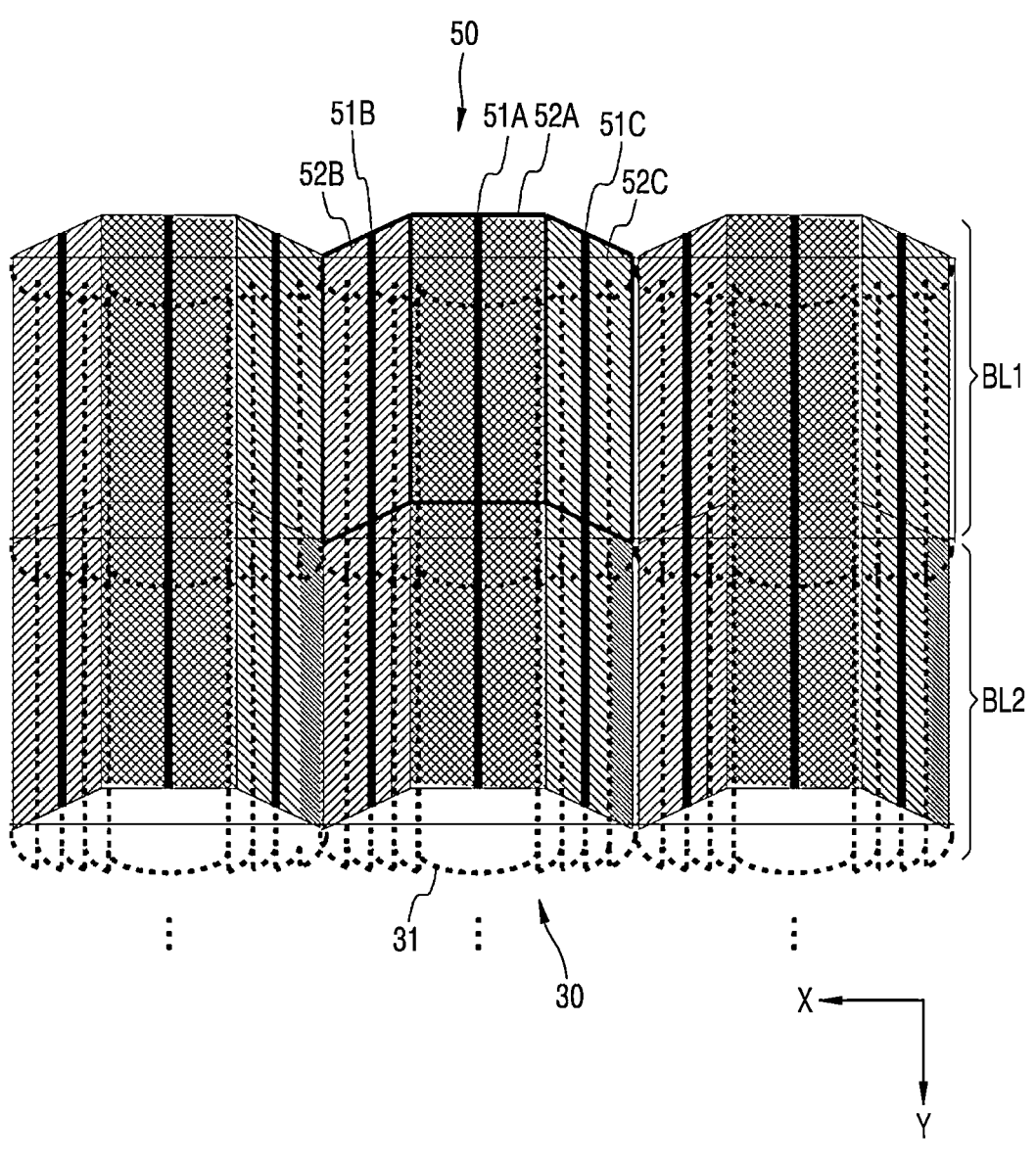
FIG. 5 is a bird's eye view illustrating a light source unit, according to an embodiment.

FIG. 5 is a bird's eye view illustrating the light source units 50 of Embodiment 1. A plurality of light source units 50 are connected along the X-axis direction, like the second lens elements 31. A distance between the linear light sources 51A in adjacent light source units 50 is the same as a pitch of the second lens element 31 included in the cylindrical lens array 30. The same applies to a distance between the linear light sources 51B and a distance between the linear light sources 51C.

An end of the light blocking wall 52B in the positive X-axis direction is connected to the light blocking wall 52C of the adjacent light source unit 50. An end of the light blocking wall 52C in the negative X-axis direction is connected to the light blocking wall 52B of the adjacent light source unit 50. The light blocking wall 52B and the light blocking wall 52C connected to each other become closer to each other in the X-axis direction toward the positive Z-axis direction.

That is, the light blocking walls 52B and 52C are located between the linear light source 51A of their own light source unit 50 and the linear light source 51A of the adjacent light source unit 50 and are configured to inhibit incidence of light on a corresponding cylindrical lens array 30 from the adjacent light source unit 50. Accordingly, light may be prevented from being emitted at a non-corresponding angle, from a non-corresponding light source 50. In general, when a so-called repetitive 3D image is formed by emitting light at a non-corresponding angle, it interferes with incidence of parallel light at a corresponding angle by the plurality of light source units 50. However, a repetitive 3D image may be prevented by employing the above configuration.

Also, each of the plurality of light source units 50 includes light source blocks BL1, BL2, . . . arranged along the Y-axis direction of the display unit 10. In detail, the light source blocks BL included in each light source unit 50 are connected to each other along the Y-axis direction. In more detail, ends of the light blocking walls 52A, 52B, and 52C included in the light source block BL1 in a positive Y-axis direction are connected to ends of the light blocking walls 52A, 52B, and 52C included in each light source block BL2 in a negative Y-axis direction.

Figure 6:
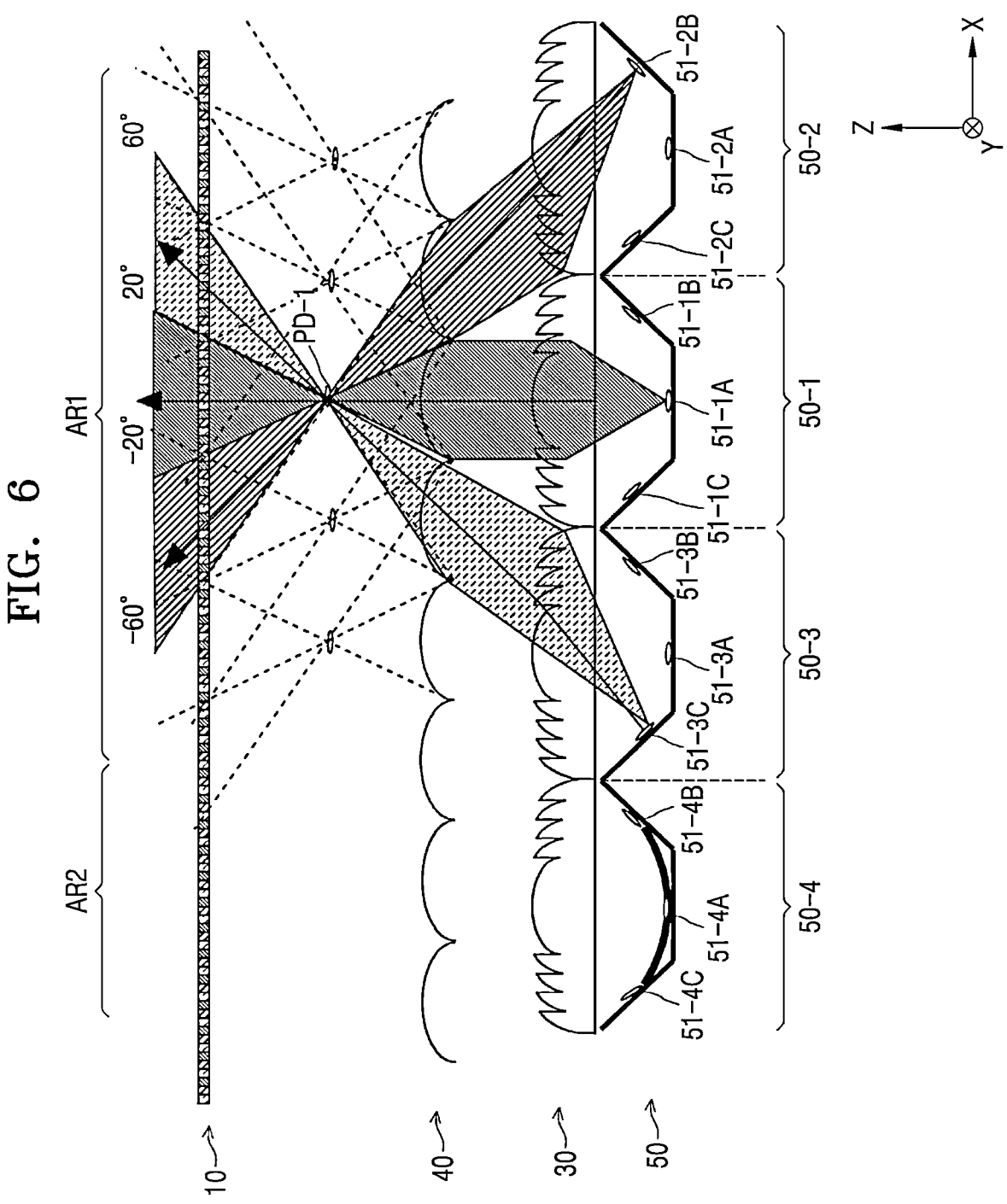
FIG. 6 is a view for describing area control, according to an embodiment.

FIG. 6 is a view for describing area control according to Embodiment 1. In the 3D display device 1, the display unit 10 is divided into a depth area AR1 and a high-definition area AR2. The 3D display device 1 displays an image according to a type of area and drives and illuminates a light source according to the type of area.

In the depth area AR1, the display unit 10 of the 3D display device 1 displays a first image corresponding to a current field. In the depth area AR1, the light source unit 50 of the 3D display device 1 turns on the linear light source 51 corresponding to the current field from among three linear light sources 51.

In the high-definition area AR2, the display unit 10 of the 3D display device 1 displays a pre-determined second image regardless of a field. In the high-definition area AR2, the light source unit 50 of the 3D display device 1 turns on all three linear light sources 51.

Figure 7:
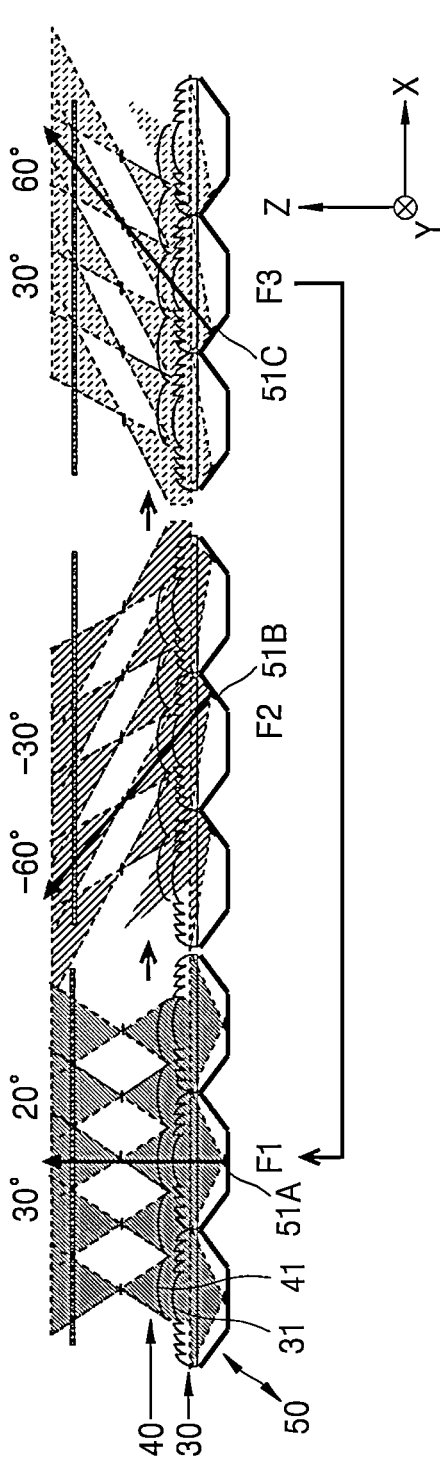
FIG. 7 is a view for describing field division, according to an embodiment.

FIG. 7 is a view for describing field control of light source driving in the depth area AR1 according to Embodiment 1. As shown in FIG. 7, in a field F1, light emitted from the linear light source 51A provided on a rear surface of the second lens element 31 of the cylindrical lens array 30 becomes parallel light directly facing the second lens element 31 of the cylindrical lens array 30. The parallel light is condensed by the first lens element 41 of the lenticular sheet 40. The light is light in a display angle range determined by a focal length of the first lens element 41, a pitch of the first lens element 41, and an angle of illuminating parallel light, and illuminates the display unit 10. That is, the 3D display device 1 may reproduce a ray representing the 3D image 2 in this display angle range.

A display angle range of the field F1 is temporarily set to ±30°=60°. In this case, in a field F2, the linear light source 51B separated by a certain distance df from the second lens element 31 of the cylindrical lens array 30 is turned on. In this case, light paralleled by the second lens element 31 is incident on the first lens element 41 of the lenticular sheet 40 at an angle of 45°. The light is light in a display angle range of −30° to −60°, and illuminates the display unit 10. Accordingly, in this case, the 3D display device 1 may reproduce a ray in a display angle range of −30° to −60°.

Also, in a field F3, when the linear light source 51C is turned on, based on the same principle as in the field F2, the 3D display device 1 may reproduce a ray in a display angle range of 30° to 60°. When display images are synchronized and repeatedly displayed in these three different fields, the 3D display device 1 becomes a display that reproduces an angle range of 120° from −60° to 60°. In addition, the angle of 120° is referred to as a viewing angle.

Figure 8:
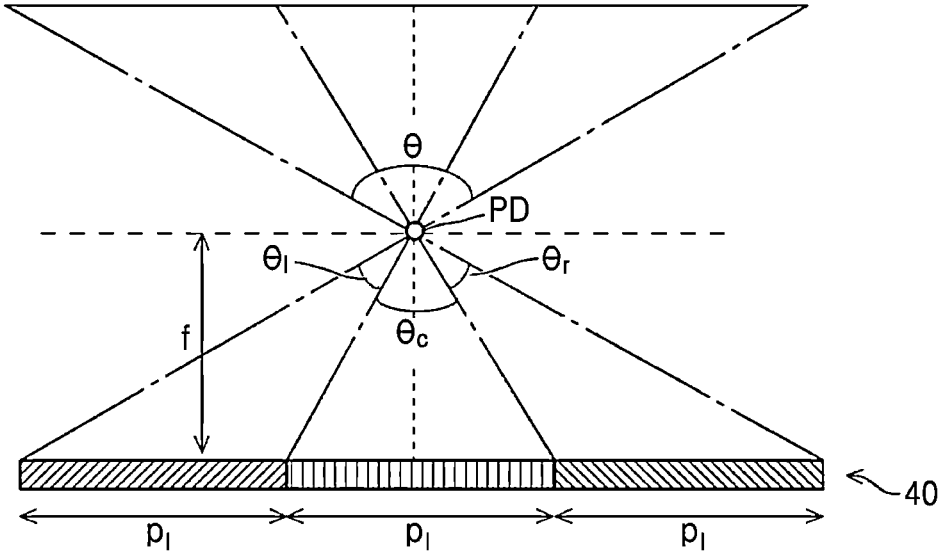
FIG. 8 is a view illustrating a relationship between a viewing angle and a lens pitch of a first lens element, according to an embodiment.

FIG. 8 is a view illustrating a relationship between a viewing angle and a lens pitch pl of the first lens element 41 according to Embodiment 1. When a viewing zone is expanded in N fields (N is a natural number) to obtain a viewing angle θ, a focal length (f) of the first lens element 41 of the lenticular sheet 40 is expressed as in the following equation.

[Equation 3]

$$f = N p_l / (2\tan(\theta/2)) \tag{3}$$

For example, in the case of three fields, an angle range θc of the first lens element 41 at the center is expressed as in the following equation.

[Equation 4]

$$\theta = 2\tan^{-1}(p_l/(2f)) \tag{4}$$

Also, an angle range Or of the first lens element 41 on the right is expressed as in the following equation.

[Equation 5]

$$\theta_r = (\theta - \theta_c)/2 \tag{5}$$

An angle range θ1 of the first lens element 41 on the left is the same as Or.

In display in which a display angle range is expanded by field division, synchronization with a display image plays an important role.

Figure 9:
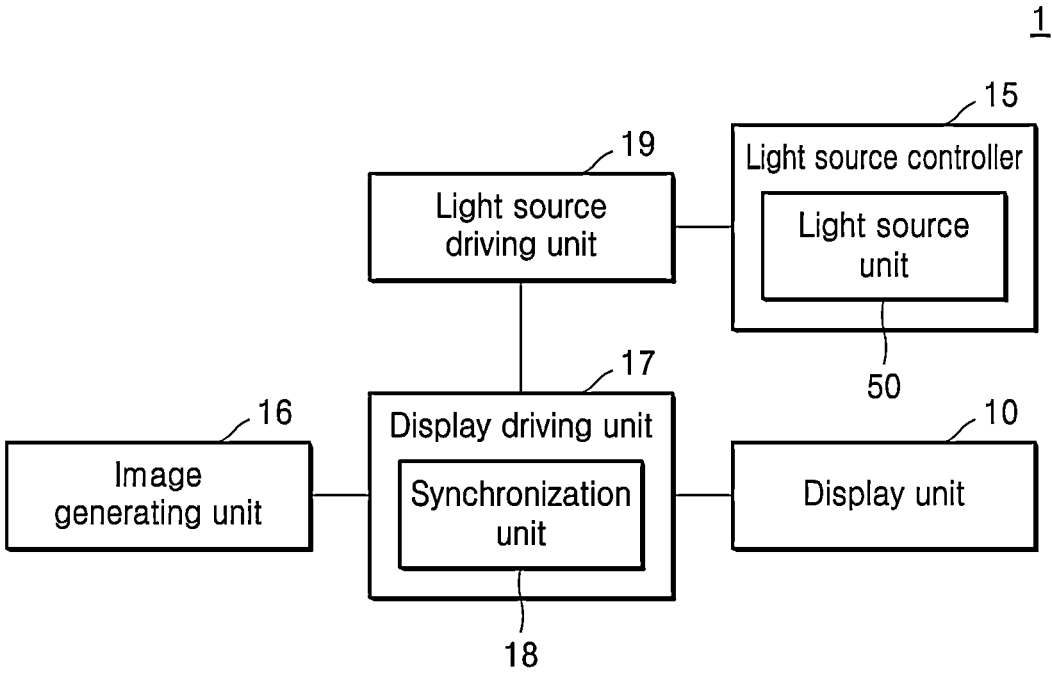
FIG. 9 is a block diagram illustrating a functional configuration of a 3D display device, according to an embodiment.

FIG. 9 is a block diagram illustrating a functional configuration of the 3D display device 1 according to Embodiment 1. The 3D display device 1 includes an image generating unit 16, a display driving unit 17, and a light source driving unit 19 in addition to the light source controller 15 and the display unit 10. The display driving unit 17 may also be referred to as a display driver 17, and the light source driving unit 19 may also be referred to as a light source driver 19.

The image generating unit 16 generates a first image and a second image based on a multi-view image. The image generating unit 16 supplies the generated image to the display driving unit 17. The image generating unit 16 is, for example, an image playback device.

The display driving unit 17 inputs a first image corresponding to a parallax display method and a second image corresponding to a high-definition display method to the display unit 10 by area division and displays the first image and the second image. The display driving unit 17 switches a first image corresponding to each display angle range through field division for an area where the first image is displayed and displays the switched first image on the display unit 10.

The light source driving unit 19 drives a plurality of light source units 50 through area control so that the number of linear light sources used to illuminate the second image from among the linear light sources 51 included in each light source unit 50 is greater than the number of linear light sources used to illuminate the first image. The light source driving unit 19 is, for example, an LED lighting circuit.

An angle range corresponding to a first image input to the display unit 10 may be the same as an angle range corresponding to the linear light source 51 that is turned on. In order to realize matching of angle ranges, the display driving unit 17 includes a synchronization unit 18.

The synchronization unit 18 may be a synchronization circuit, and may be referred to as a synchronization module. The synchronization unit 18 detects a change in image display and applies a synchronization signal to the light source driving unit 19. And, in a parallax display method, the light source driving unit 19 transmits a field signal for driving the linear light source 51 according to a display angle range of each field to the light source unit 50. Accordingly, as a field is switched, the light source driving unit 19 may turn on the linear light source 51 according to a display angle range corresponding to the first image after switching. Accordingly, the first image displayed on the display unit 10 and the light source unit 50 are synchronized to expand a display angle range.

Figure 10:
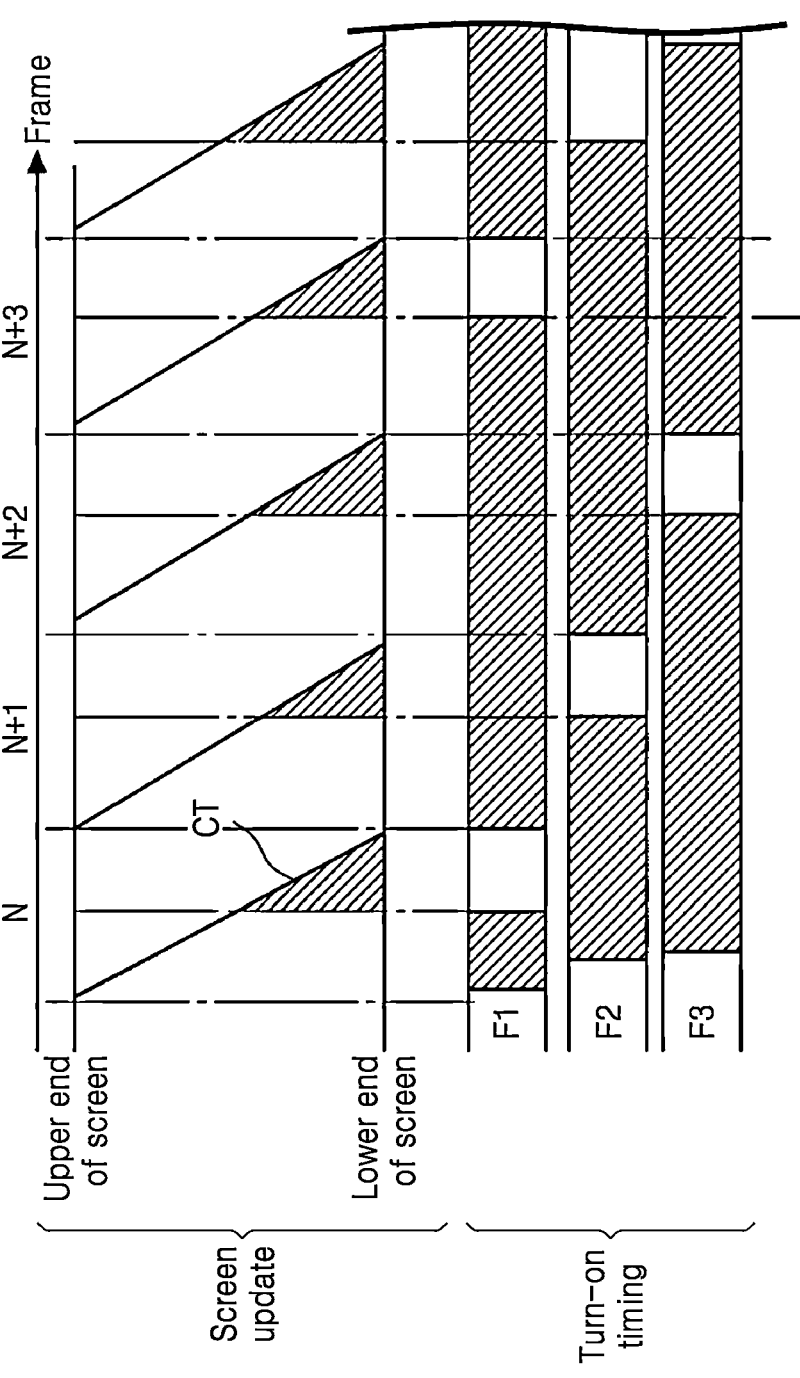
FIG. 10 is a view illustrating an example of a timing chart of light source driving and display driving, according to an embodiment.
Figure 11:
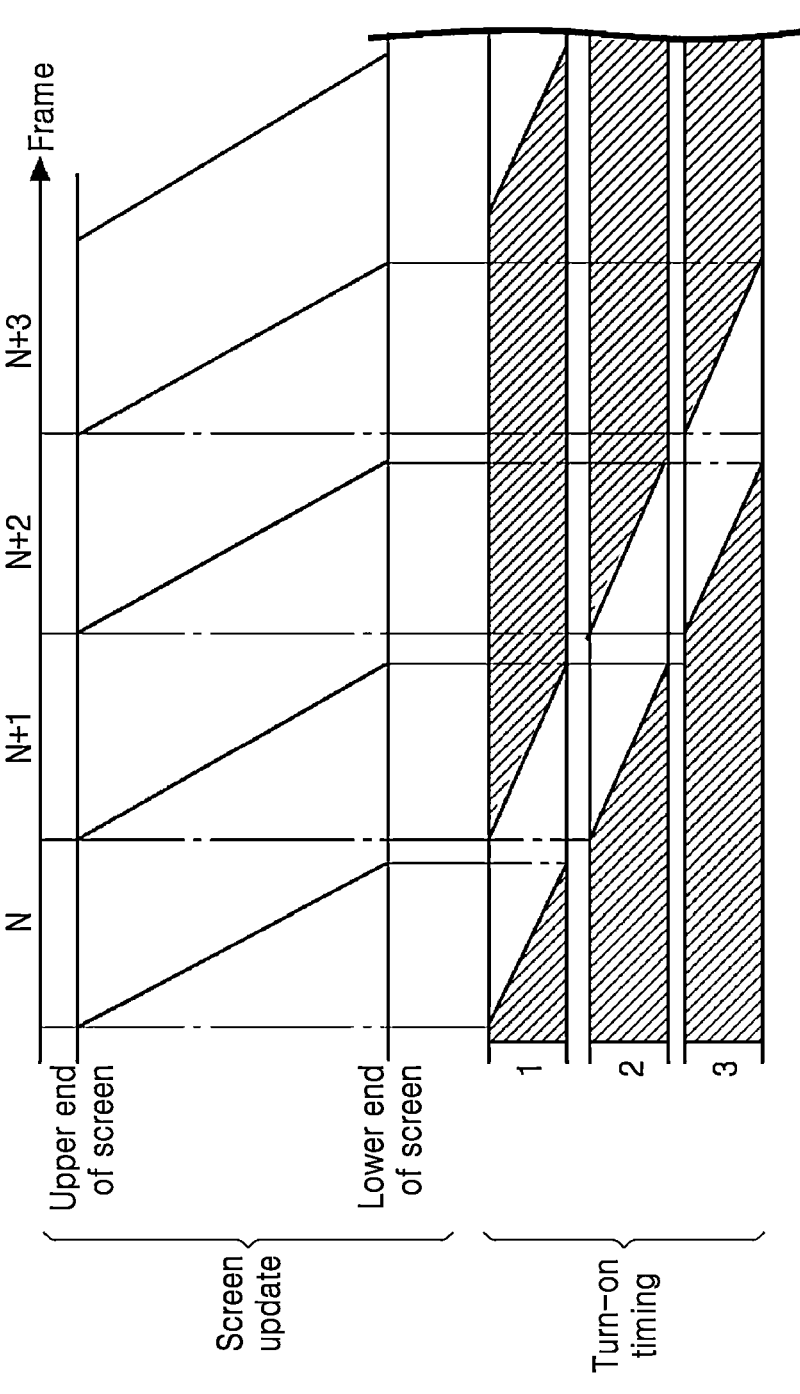
FIG. 11 is a view illustrating an example of a timing chart of light source driving and display driving, according to an embodiment.

FIGS. 10 and 11 are views illustrating an example of a timing chart of light source driving and display driving according to Embodiment 1.

In general, in an LCD, a timing of screen switching is shifted at each scanning position from an upper end to a lower end of a screen (e.g., from an end of the display unit 10 in the positive Y-axis direction to an end of the display unit 10 in the negative Y-axis direction in Embodiment 1). The display driving unit 17 switches a first image displayed on the display unit 10 to a first image according to a field in a cycle of vertical scanning. The light source driving unit 19 switches the linear light source 51 that is turned on to the linear light source 51 according to a field, in the cycle of vertical scanning.

In FIG. 10, for example, the light source driving unit 19 equally turns on the light source block BL included in the linear light source 51 according to a field regardless where the light source block BL is located in the Y-axis direction. Also, in FIG. 10, a portion marked by a diagonal line indicates a turn-on time and a portion not marked by a diagonal line indicates a turn-off time. In this case, because there is a difference in a driving timing between the upper end and the lower end of the screen as the turn-on time increases, cross-talk CT occurs.

In FIG. 11, the synchronization unit 18 synchronizes a position of vertical scanning by the display driving unit 17 with a position of the light source block BL turned on or off by the light source driving unit 19. In detail, at a timing when a field indicated by a synchronization signal is switched, the light source driving unit 19 starts turning on the linear light source 51 according to a next field and turns on the light source block BL included in the linear light source 51 toward a vertical scanning direction based on the synchronization signal. Also, the light source driving unit 19 turns off the light source block BL included in the linear light source 51 that was turned on in a previous field based on the synchronization signal toward the vertical scanning direction. Accordingly, cross-talk does not occur easily even when a turn-on time is long.

Figure 12:
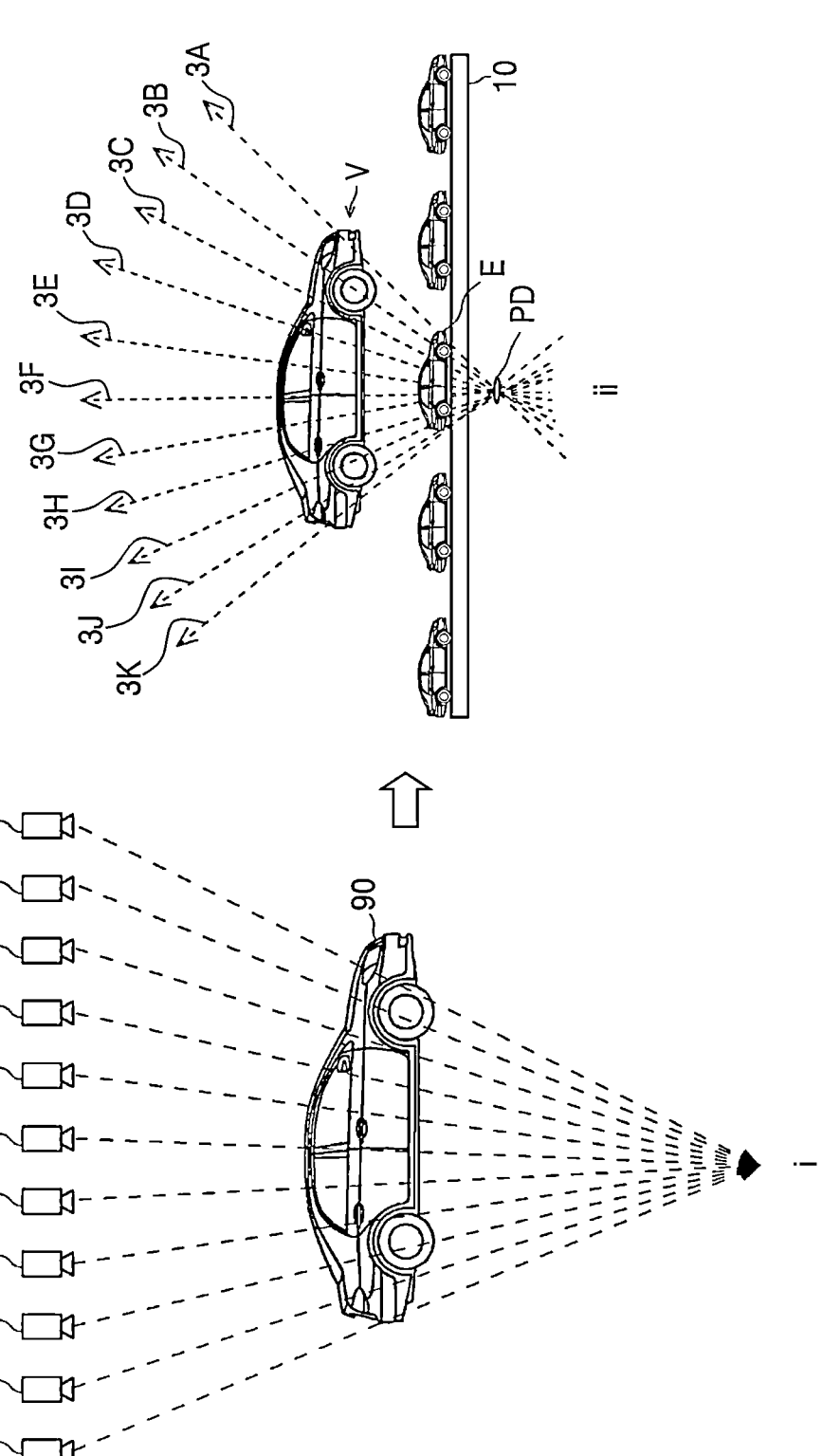
FIG. 12 is a view for describing a method of generating a first image from a multi-view image, according to an embodiment.

FIG. 12 is a view for describing a method of generating a first image from a multi-view image according to Embodiment 1. In the following description, a horizontal direction will be considered for clarity of explanation.

(i) of FIG. 12 illustrates a method of capturing a multi-view image. A multi-view image is generated by photographing an object 90 with cameras 60, the number of which corresponds to the number of pixels corresponding to an element image width (first image width). For example, when a first image width is as long as 11 pixels, a multi-view image in 11 directions is required. Accordingly, a multi-view image in 11 directions is captured by photographing the object 90 in 11 directions by using cameras 60A to 60K that photograph 11 directions. In addition, not only live-action photographing but also computer graphics (CG) require the cameras 60, the number of which corresponds to the number of pixels corresponding to the first image width.

(ii) of FIG. 12 illustrates a state in which a 3D image V is reproduced by using a multi-view image. First, the image generating unit 16 generates a plurality of first images by rearranging pixels of a multi-view image group having directivity. In detail, the image generating unit 16 generates a first image by sampling pixels included in the multi-view image group according to a position of each first lens element 41 of the lenticular sheet 40. For example, the image generating unit 16 generates a first image synthesized from a multi-view image corresponding to −30° to −60°, a first image synthesized from a multi-view image corresponding to −30° to 30°, and a first image synthesized from a multi-view image corresponding to 30° to 60°. The display unit 10 driven by the display driving unit 17 sequentially displays three types of first images in three fields. As a first image E being displayed is illuminated, rays 3A to 3K corresponding to the cameras 60A to 60K are emitted from the first image E. Accordingly, the 3D image V is reproduced.

The display driving unit 17 sequentially displays three types of first images in three fields on the display unit 10. In this case, the light source driving unit 19 turns on the linear light source 51 corresponding to a display angle range of the first image being displayed in synchronization with switching of display.

Figure 13:
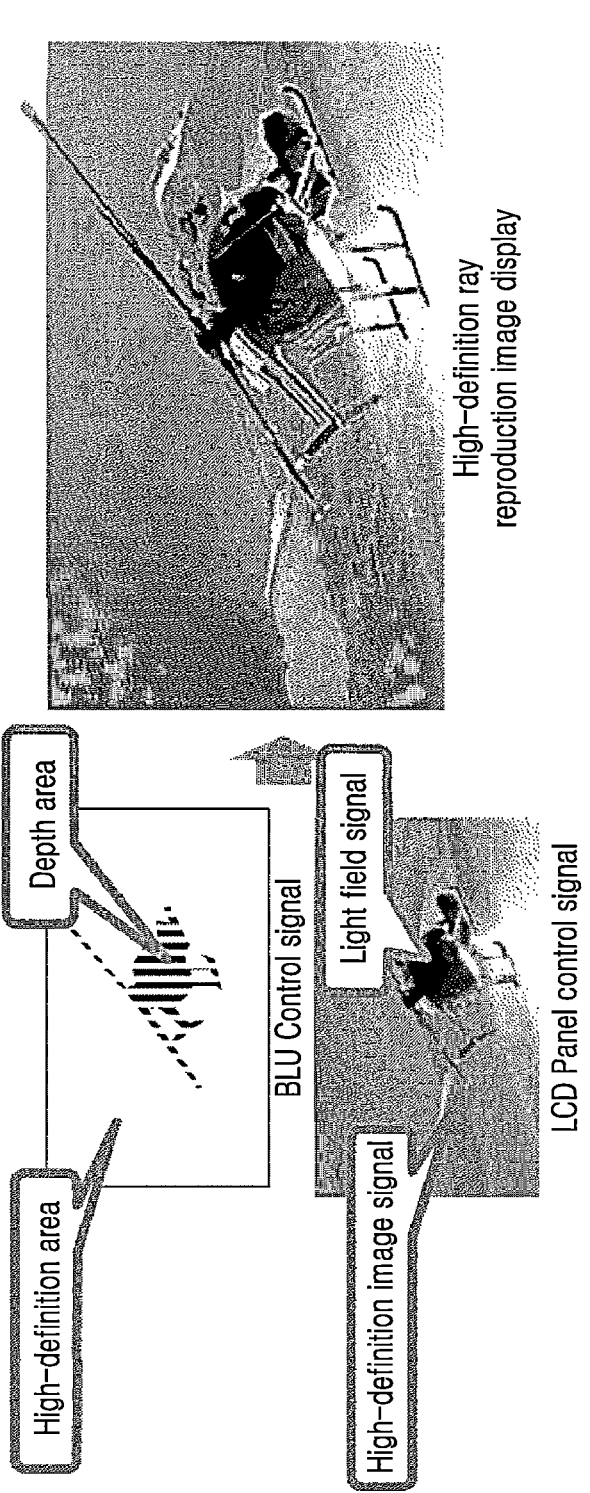
FIG. 13 is a view for describing area division, according to an embodiment.

FIG. 13 is a view for describing an area division method according to Embodiment 1. As shown in FIG. 13, when a turn-on range is expanded by increasing the number of turned-on linear light sources 51 of the light source unit 50, high-definition display without parallax may be realized. The image generating unit 16 divides a display image into a high-definition area and a depth area, according to a depth of the display image.

An area is optimized by using a depth of a display image. A depth map may be output relatively easily with CG. Accordingly, the image generating unit 16 may easily specify an area with a small depth as a high-definition area with respect to a reference surface (around the display unit 10) of the display image based on information of the depth map. For example, the image generating unit 16 may determine an image area included in a multi-view image and having parallax that is equal to or less than a certain threshold value as a high-definition area. Also, for example, the image generating unit 16 may determine an image area included in the multi-view image and having parallax that is greater than the certain threshold value as a depth area.

For the high-definition area, the image generating unit 16 generates an image obtained by photographing a subject at a certain viewpoint as a second image. The certain viewpoint may be, for example, a front viewpoint. In addition, for the depth area, the image generating unit 16 may generate a first image by using the method described with reference to FIG. 12.

Because the light source driving unit 19 controls the light source unit 50 based on area division, high-definition display may be realized by using all of the pixel arrays 11 of the display unit 10 in the high-definition area, and depth may be expressed in the depth area. A user may perceive display with high definition and depth.

In addition, the image generating unit 16 may create display data by locating high-definition display around a reference surface or by analyzing continuous frames and designating a depth for a high-definition image as a reference surface.

As such, in Embodiment 1, the 3D display device 1 has a simple configuration in which two types of lens arrays are combined and may display a parallax display method and a high-definition display method in area division. Accordingly, the problem of resolution degradation caused by the parallax display method may be reduced. Accordingly, a clearer 3D image may be appropriately displayed while ensuring depth.

Embodiment 1 may be modified as follows.

First Modified Example of Embodiment 1

Figure 14:
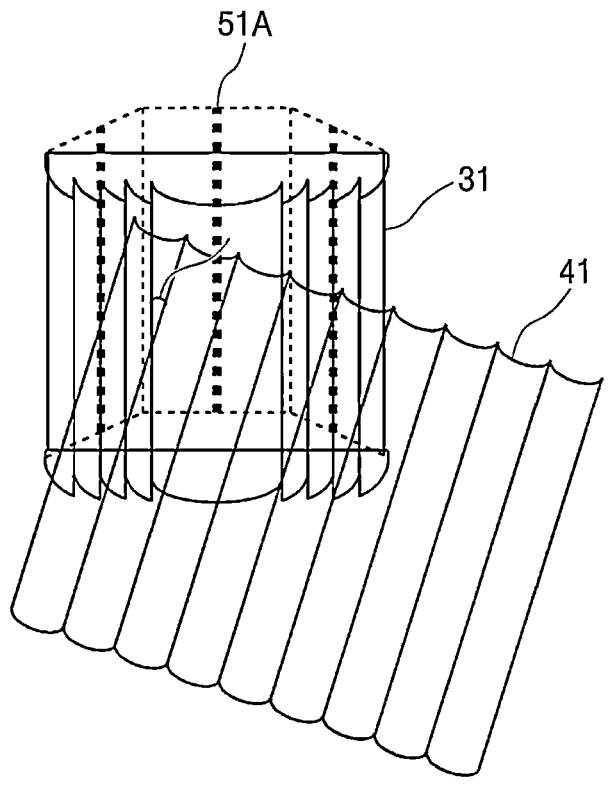
FIG. 14 is a view illustrating an arrangement of a cylindrical lens array and a lenticular sheet, according to an embodiment.

FIG. 14 is a view illustrating an arrangement of the cylindrical lens array 30 and the lenticular sheet 40 according to a first modified example of Embodiment 1.

As shown in FIG. 14, basically, all of the cylindrical lens array 30, the linear light source 51, and the lenticular sheet 40 may be arranged along a vertical direction with respect to a screen of the display unit 10, thereby having parallax in a horizontal direction. However, when ridges of the lenticular sheet 40 are arranged along the vertical direction, the edges may interfere with a pixel pattern, thereby generating a moire pattern. The ridges of the lenticular sheet 40 are a line parallel to an axis of a semi-cylindrical shape of the first lens element 41.

Accordingly, the moire pattern may be eliminated by slightly tilting the lenticular sheet 40 from the vertical direction. In detail, ridges of the cylindrical lens array 30 may be arranged along the vertical direction of the pixel array 11 included in the display unit 10, and the ridges of the lenticular sheet 40 may be inclined at a pre-determined angle with respect to the vertical direction.

Also, the 3D display device 1 may assign parallax based on an inclination angle of the lenticular sheet 40 and a positional relationship of the pixel array 11 in the vertical direction.

Figure 15:
FIG. 15 is a view illustrating an arrangement of a first lens element of a lenticular sheet and a parallax image, according to an embodiment.

FIG. 15 is a view illustrating an arrangement of the first lens element 41 of the lenticular sheet 40 and a first image according to the first modified example of Embodiment 1. One pixel array 11 includes three sub-pixels RGB. Because each sub-pixel is observed in a different direction, the 3D display device 1 may assign parallax to each sub-pixel. Also, in the Y-axis direction, because light skips in different directions due to misalignment between the ridges of the cylindrical lens array 30 and the lenticular sheet 40, the 3D display device 1 may adjust parallax. In the drawing, for example, the lenticular sheet 40 having a width of 9 pixels in the X-axis direction is tilted by tan ¼. Accordingly, parallax of 36 directions may be assigned. Strictly, although the same display direction is assigned to RGB included in one pixel array 11, a display direction is misaligned according to a pixel position, and thus, parallax of 108 directions is substantially assigned. The image generating unit 16 synthesizes an interpolated image as a first image, by using 36 multi-view images and shifting the multi-view images by ⅓ for each RGB. Accordingly, more accurate display may be realized with 36 multi-view images.

Also, in the first modified example of Embodiment 1, the 3D display device 1 may further include an anisotropic diffusion sheet in the light source controller 15.

Figure 16:
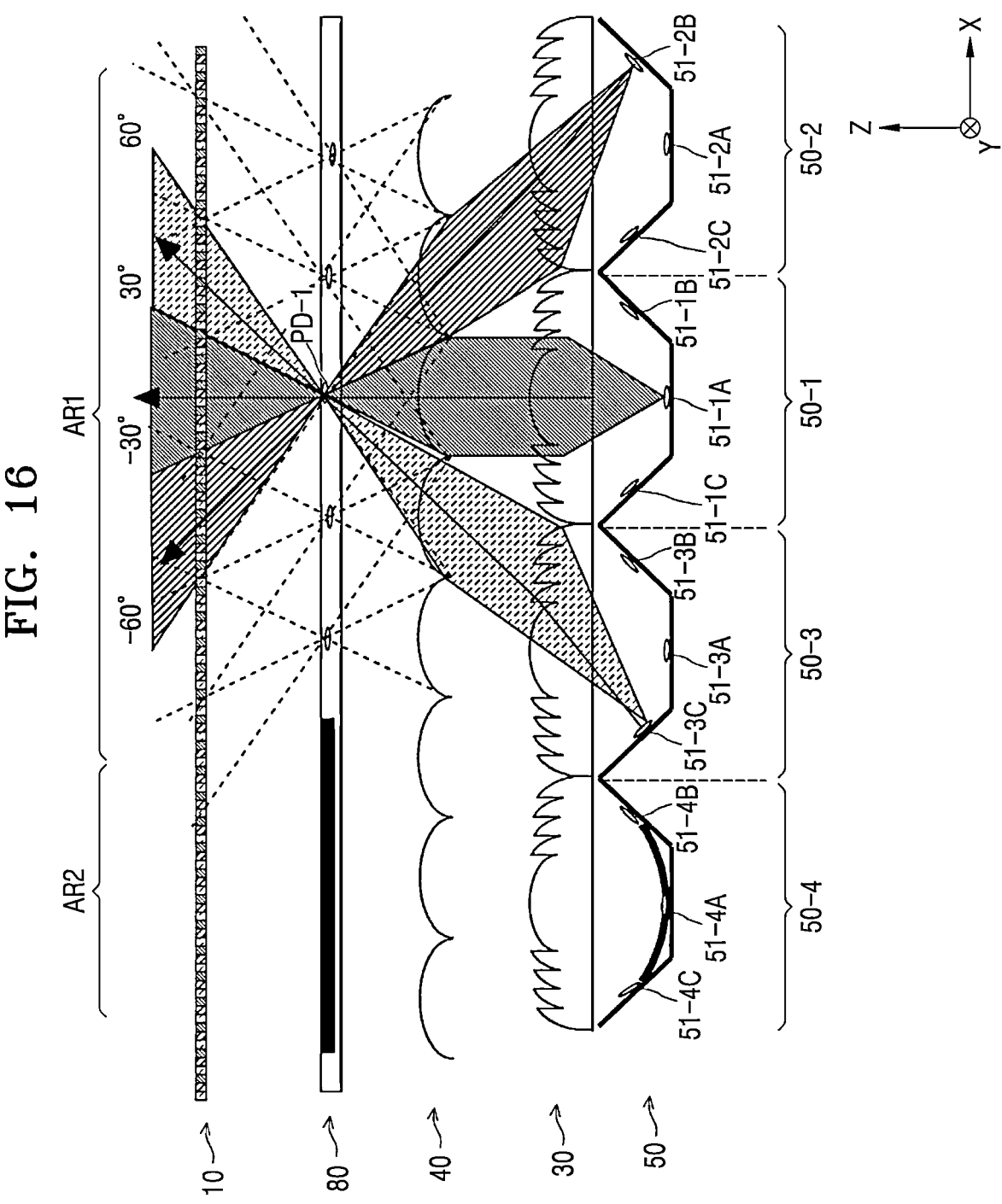
FIG. 16 is a view illustrating an arrangement of an anisotropic diffusion sheet, according to an embodiment.

FIG. 16 is a view illustrating an anisotropic diffusion sheet 80 according to the first modified example of Embodiment 1. The anisotropic diffusion sheet 80 is located on an XY plane between the lenticular sheet 40 and the display unit 10. In detail, the anisotropic diffusion sheet 80 is located on an imaging plane of the lenticular sheet 40, that is, at a position away from the lenticular sheet 40 in the Z-axis direction by an approximate focal length of the lenticular sheet 40. This is because light is incident as parallel light from the cylindrical lens array 30. The approximate focal length may be a focal length or a distance of 0.9 times to 1.1 times a focal length. The anisotropic diffusion sheet 80 makes the diffusion of light in a ridge direction of the lenticular sheet 40 stronger than the diffusion of light in a direction parallel to a main surface of the anisotropic diffusion sheet 80, that is, a direction perpendicular to the ridges of the lenticular sheet 40. Accordingly, the effect on a light collection distribution in the direction perpendicular to the ridge direction of the lenticular sheet 40 is reduced, and thus, a width in the direction perpendicular to the ridges in the light collection distribution is not easily widened. Accordingly, cross-talk of a display image may be reduced. Also, because the direction along the ridges of the lenticular sheet 40 does not affect cross-talk of a display image, light may be actively diffused in that direction.

In the cylindrical lens array 30, luminance unevenness is likely to occur around a lens or a lens joint surface. However, because the ridges of the lenticular sheet 40 are inclined with respect to the ridges of the cylindrical lens array 30 and light is actively diffused in a direction where light may be diffused, luminance unevenness occurring around a lens or a lens joint surface of the cylindrical lens array 30 may be reduced.

Embodiment 2

Next, Embodiment 2 will be described. In Embodiment 2, the 3D device 1 divides display and illumination corresponding to a parallax display method and a high-definition display method into fields and performs control for each field.

Figure 17:
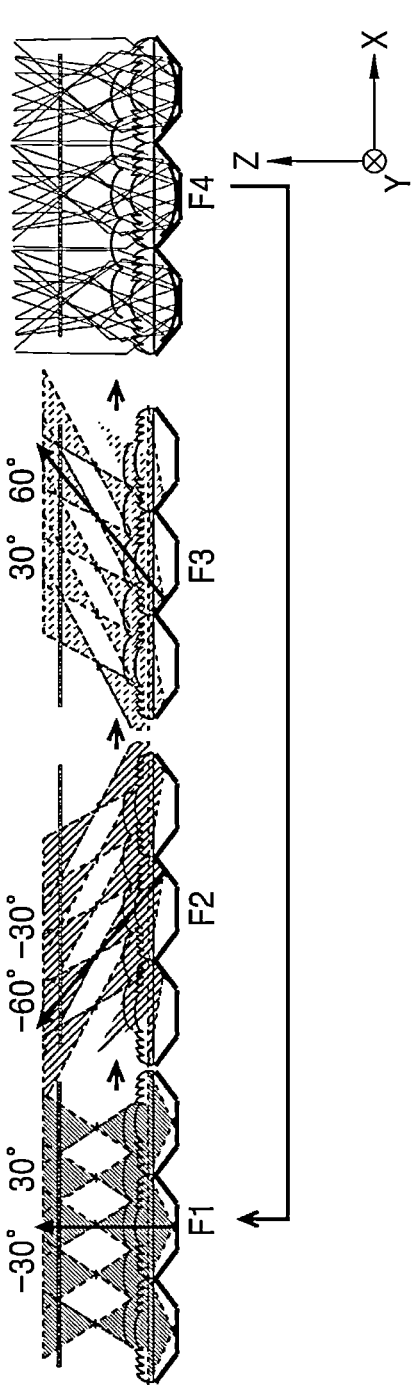
FIG. 17 is a view for describing field control including a high-definition field, according to an embodiment.

FIG. 17 is a view for describing field control including a high-definition field according to Embodiment 2. In Embodiment 2, a field to which a high-definition display method is applied (hereinafter, a high-definition field) is inserted into a field to which a parallax display method described in Embodiment 1 is applied (hereinafter, referred to as a depth of field).

The display driving unit 17 switches and displays a first image and a second image on the display unit 10, according to whether it is a depth of field or a high-definition field. In addition, the depth of field is further divided into a plurality of fields, and the display driving unit 17 displays a first image according to a current field.

The light source driving unit 19 switches the number of linear light sources 51 that are turned on, at a timing when a field is switched between a depth of field and a high-definition field. Also, when switching between a depth of field and a depth of field or switching from a high-definition field to a depth of field, the light source driving unit 19 turns on the linear light source 51 according to a display angle range corresponding to a field after switching.

In FIG. 17, depths of field are F1, F2, and F3, and a high-definition field is F4. For example, the 3D display device 1 repeatedly switches the depth of field F1, the depth of field F2, the depth of field F3, and the high-definition field F4 in this order.

Because area control of a light source is unnecessary, the light source may be more simply controlled. Because an image displayed in a high-definition field may be observed from all angles, the luminance observed by a user may be improved when the high-definition field is combined with a depth of field. Also, the combination of a high-definition field and a depth of field is also advantageous in terms of a refresh rate.

Figure 18A:
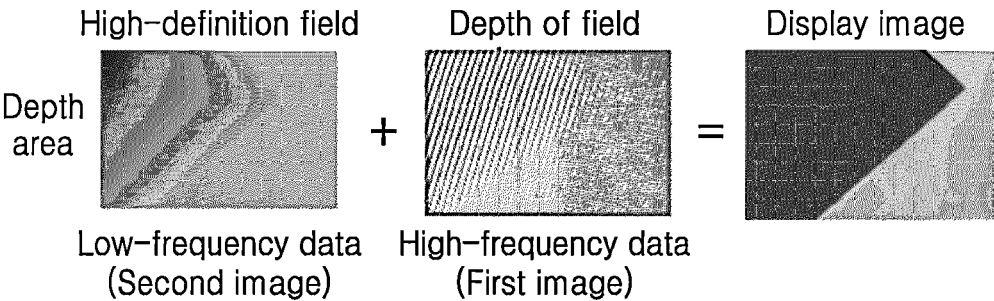
FIG. 18A is a view for describing a method of generating a first image, according to an embodiment.
Figure 18B:
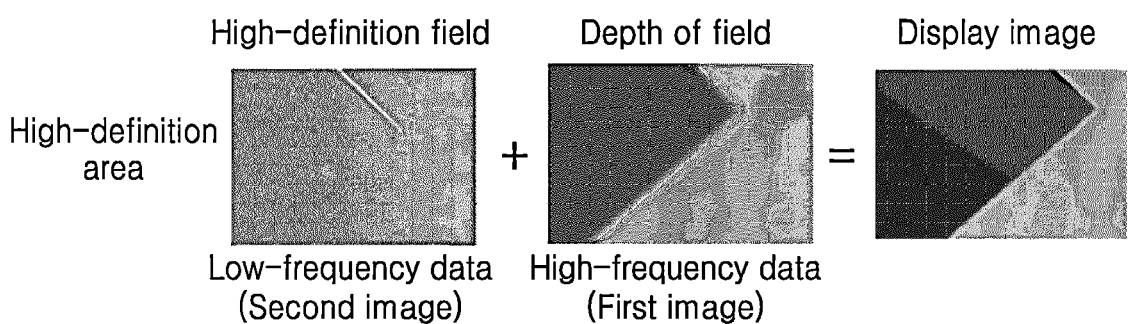
FIG. 18B is a view for describing a method of generating a second image, according to an embodiment.

FIG. 18A is a view for describing a method of generating a first image according to Embodiment 2. FIG. 18B is a view for describing a method of generating a second image according to Embodiment 2.

In Embodiment 2, the display unit 10 displays a first image of a depth area and a first image of a high-definition area, in a depth of field. Also, the display unit 10 displays a first image of a depth area and a second image of a high-definition area, in a high-definition field. A depth area corresponds to an image area where parallax between multi-view images is greater than a certain threshold value, and a high-definition area corresponds to an image area where parallax between multi-view images is equal to or less than the certain threshold value.

In Embodiment 2, a display image with depth is reproduced by combining a depth of field with a high-definition field. That is, a user perceives a depth component of a display image by observing a first image of a depth area displayed in a depth of field and a second image of a depth area displayed in a high-definition field. Also, a user perceives a planar component of a display image by observing a first image of a high-definition area displayed in a depth of field and a second image of a high-definition area displayed in a high-definition field.

A depth component of a display image is reproduced by displaying data indicating parallax of a depth area as a first image in a depth of field. In a high-definition field, the 3D display area 1 may not display anything other than a common component between parallaxes in a depth area. A common component between parallaxes is low-frequency data in a depth area in a synthesized element image, which becomes a second image of the depth area. Low-frequency data is data obtained by extracting components below a certain frequency. A display image observed in each direction is perceived by adding a first image having parallax to a second image having no parallax. Accordingly, the 3D display device 1 generates a first image by subtracting the low-frequency data from an element image to match a parallax image of each direction where a display image is expected. That is, after an element image is generated by sampling at a lens pitch of the lenticular sheet 40 to correspond to a depth area, a second image is calculated from a common low-frequency component, and a first image is synthesized by subtracting the second image from the element image. Accordingly, in the present drawing, a first image of a depth area is described as high-frequency data. The element image is a first image described in Embodiment 1. Even when a display angle range is expanded in a plurality of fields, low-frequency data of an average image of element images of the plurality of fields is referred to as a second image of a depth area. This is because a high-definition field is displayed as common data for all depths of field.

In contrast, a planar component of a display image is reproduced by displaying high-definition data of a high-definition area as a second image in a high-definition field. In a depth of field, the 3D display device 1 may not display anything other than an element image sampled at a lens pitch of the lenticular sheet 40 to correspond to a high-definition area. The element image is low-frequency data in a high-definition area of a display image and becomes a first image of the high-definition area. Like in a depth area, a display image observed in each direction is perceived by adding a first image to a second image. Accordingly, the 3D display device 1 generates a second image by subtracting low-frequency data from a high-definition image so that a second image of a high-definition area sampled at a panel resolution (a display resolution of the display unit 10) matches a high-definition display image where a display image is expected. That is, a second image of a high-definition area is generated by sampling at a panel resolution, and then generated by subtracting a first image, which is a low-frequency component sampled at a lens pitch. Accordingly, in the drawing, a second image of a high-definition area is described as high-frequency data. In addition, even when a display angle range is expanded in a plurality of fields, because a high-definition area does not have parallax, the same image is displayed at a depth of field.

Because the 3D display device 1 optimizes a first image and a second image as described above, a user may observe a display image with high definition and depth. Also, the 3D display device 1 may display a bright image by further optimizing data by using that it may be expressed as an additional value. In this case, subtracting a common component may be omitted.

As such, for a depth area, the image generating unit 16 generates a low-frequency component of an element image obtained by sampling a multi-view image as a second image. Also, for a depth area, the image generating unit 16 generates a first image by subtracting a second image from an element image obtained by sampling a multi-view image.

Also, for a high-definition area, the image generating unit 16 generates a low-frequency component sampled at a lens pitchy of the lenticular sheet 40 from a certain viewpoint as a first image. Also, for a high-definition area, the image generating unit 16 generates a second image by subtracting a first image from an image sampled at a panel resolution from a certain viewpoint.

In this case, cross-talk inevitably occurs between adjacent pixels, due to aberration of an optical system. Also, it is difficult to completely eliminate cross-talk between fields in time. However, the 3D display device 1 may obtain an expected display image by inversely calculating such cross-talk and applying inverse correction to data.

Even when a luminance difference occurs on an entire screen, when a display unit is the display unit 10 such as an LCD with a high response speed (e.g., 100 Hz or more), it is difficult to feel flicker because an image of 50 Hz is displayed by 2-field control. For optimization, it is considered to use a depth of a display image. With CG, a depth map may be output relatively easily, and with this information, for a reference surface of a display image (around the display unit 10), optimization may be relatively easily performed by making an area with a small depth as a high-definition area. It is also possible to create display data by locating high-definition display around a reference surface or by analyzing continuous frames and designating a depth for a high-definition image as a reference surface.

In addition, display and illumination of both a parallax display method and a high-definition display method are controlled by field division in Embodiment 2, but may be controlled in combination with area division. Accordingly, an angle display range may be expanded. However, considering the operation and response speed of the LCD, it is realistically difficult to have a refresh rate that is too high. Accordingly, in order to expand an angle range, a plurality of fields may be assigned to a depth of field, and one field may be assigned to a high-definition field. For example, it is realistic to perform control in three or four fields by assigning two or three fields to a depth of field and assigning one field to a high-definition field. Alternatively, the display driving unit 17 may display a first image in two or three fields and display a second image in one field. Also, the light source driving unit 19 may perform light source control of a parallax display method in two or three fields and may perform light source control of a high-definition display method in one field.

In addition, an embodiment is not limited to the above embodiment and may be appropriately changed without departing from the purpose. For example, although the number of linear light sources 51 included one light source unit 50 is 3 in the above embodiment, the disclosure is not limited thereto and the number of linear light sources 51 may be three or more. In this case, when a first image is displayed through area division or field division, the light source driving unit 19 may turn on one linear light source 51, and when a second image is displayed through area division or field division, the light source driving unit 19 may turn on all of the linear light sources 51.

Embodiment 3

Next, a 3D display device according to Embodiment 3 will be described.

Figure 25:
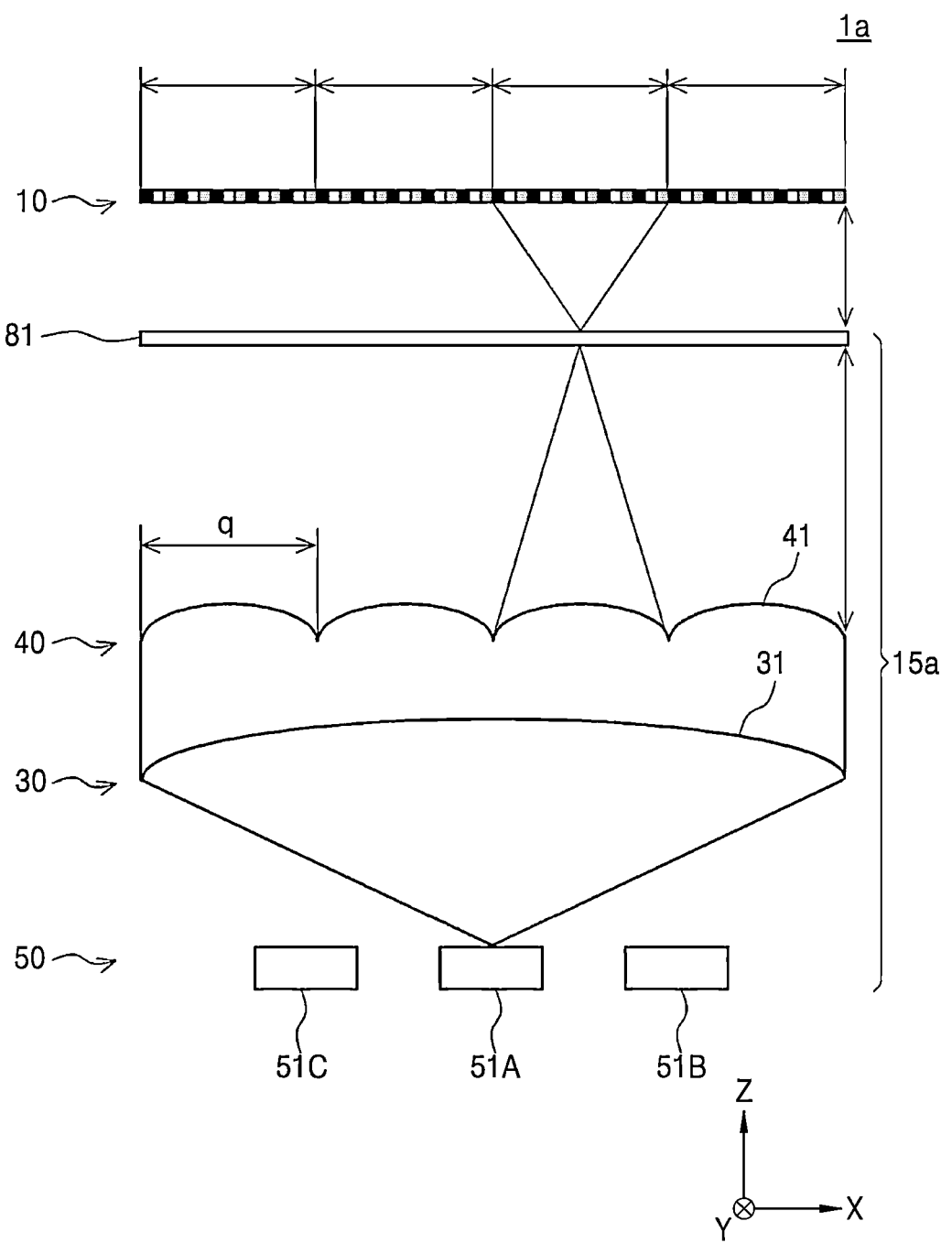
FIG. 25 is a schematic cross-sectional view illustrating a 3D display device, according to an embodiment.

A 3D display device of an embodiment includes a diffusion sheet 81 and is designed to expand a display range beyond a viewing angle of the lenticular sheet 40. FIG. 25 is a schematic cross-sectional view illustrating a 3D display device 1*a* according to Embodiment 3. As shown in FIG. 25, in the 3D display device 1*a* of the present embodiment, a light source controller 15*a* further includes a diffusion sheet 81. The diffusion sheet 81 is located between the display unit 10 and the lenticular sheet 40 and is located at a position including each focal position of each first lens element 41. In detail, the diffusion sheet 81 is located on a plane including each focal position of each first lens element 41. Alternatively, the diffusion sheet 81 may be located at a distance of 0.9 times to 1.1 times each focal position of each first lens element 41. The diffusion sheet 81 diffuses transmitted light not only in the Y-axis direction but also in the X-axis direction, unlike the anisotropic diffusion sheet 80. It is preferable that a diffusion layer of the diffusion sheet 81 is thin.

The linear light sources 51A to 51C are located on a rear side of each second lens element 31. For example, light emitted from the linear light source 51A is converted into parallel light by each second lens element 31 in the cylindrical lens array 30. The light converted into parallel light by each second lens element 31 is condensed by each first lens element 41 in the lenticular sheet 40.

The light condensed by each first lens element 41 is condensed at each focal position where the diffusion sheet 81 is located. The light condensed at each focal position then travels so that luminous flux is widened. The diffusion sheet 81 for diffusing light is located at a position including each focal position. Accordingly, diffused light transmitted through the diffusion sheet 81 may have a wider luminous flux than in a state without the diffusion sheet 81.

Diffused light transmitted through the diffusion sheet 81 is incident on the display unit 10.

Figure 26:
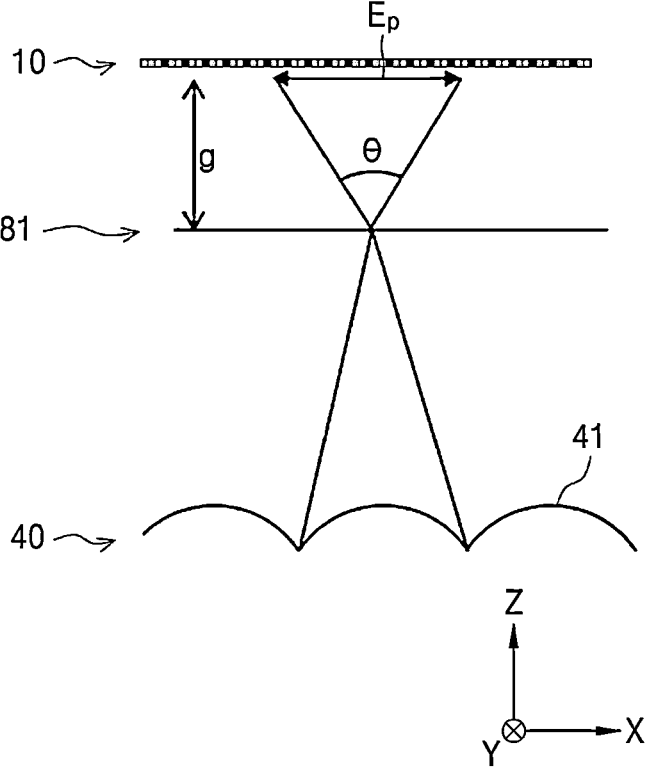
FIG. 26 is a view illustrating a relationship between a diffusion sheet and an element pixel, in a 3D display device, according to an embodiment.

FIG. 26 is a view illustrating a relationship between the diffusion sheet 81 and an element pixel, in the 3D display device 1*a* according to Embodiment 3. As shown in FIG. 26, an angle range θ of a viewing zone may be expressed as in Equation 2 by a distance g between the diffusion sheet 81 and the display unit 10 and an element pixel width Ep. The element pixel width Ep is arranged at substantially the same interval as a pitch q of each first lens element 41 in the lenticular sheet 40. A distance between the diffusion sheet 81 and the display unit 10 is shorter than a distance between the diffusion sheet 81 and the lenticular sheet 40. Light diffused from the diffusion sheet 81 illuminates the display unit 10 to spread beyond the element image width Ep.

In this arrangement, from a relationship between condensed light and a pixel, another pixel is illuminated from an observation direction. In other words, a pixel has directivity and functions as the ray reproduction type 3D display device 1*a* as described above.

In general, a range in which light may be condensed in the lenticular sheet 40 is limited to about 45°. Accordingly, a display angle range of a 3D display device including the lenticular sheet 40 was limited to 45°. In contrast, the 3D display device 1*a* according to an embodiment includes the diffusion sheet 81. Accordingly, a display range may be expanded by spreading light in the diffusion sheet 81.

Embodiment 4

Next, Embodiment 4 will be described. In an embodiment, a 3D display device 1*b* may further include a shielding plate.

Figure 27:
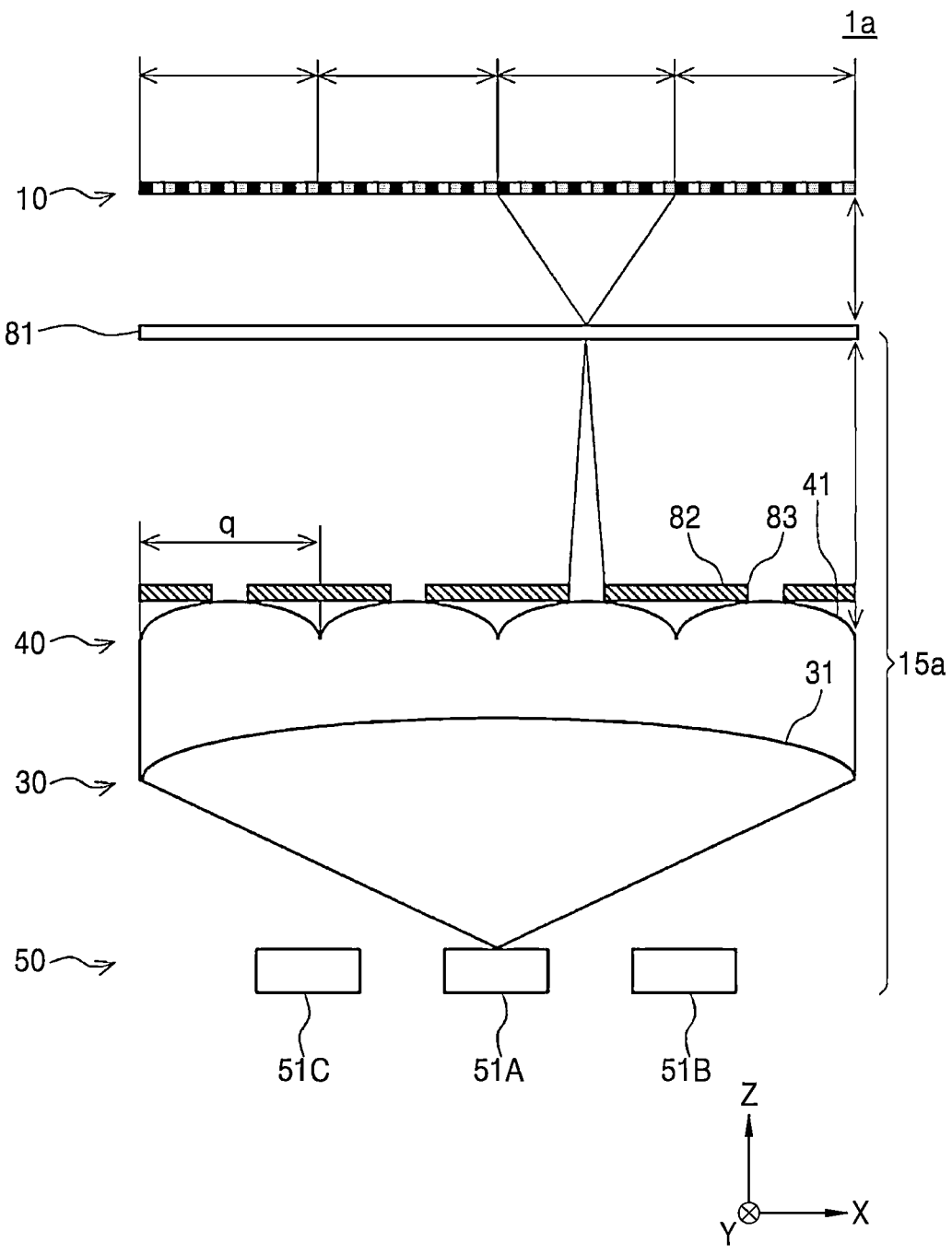
FIG. 27 is a schematic cross-sectional view illustrating a shielding plate having a slit, in a 3D display device, according to an embodiment.

FIG. 27 is a schematic cross-sectional view illustrating a shielding plate 82 having a slit 83, in the 3D display device 1*b* according to Embodiment 4. As shown in FIG. 27, in the 3D display device 1*b* of the present embodiment, a light source controller 15*b* further includes the shielding plate 82. The shielding plate 82 is located on a surface of the lenticular sheet 40. A plurality of slits 83 are arranged in the shielding plate 82. Each slit 83 is located at a central portion of each first lens element 41. Accordingly, the shielding plate 82 has a plurality of slits 83 that shield light transmitted through a peripheral portion of each first lens element 41 and transmits light transmitted through a central portion of each first lens element 41.

When light is condensed in the lenticular sheet 40, due to aberration of each first lens element 41, light transmitted through a peripheral portion of each first lens element 41 is not condensed at a focal position but is diffused around the focal position in the diffusion sheet 81. When an area around the focal position is illuminated, a pixel other than a pixel corresponding to a display direction is illuminated. Accordingly, light transmitted through a peripheral portion of each first lens element 41 becomes cross-talk in a 3D image, thereby degrading the quality of 3D display. Accordingly, light in the peripheral portion of each first lens element 41 is limited by using the shielding plate 82 having the slit 83. Accordingly, cross-talk may be reduced and the quality of 3D display may be improved.

In 3D display using a general barrier, because light is not condensed, a narrow opening is used to reduce cross-talk. Accordingly, 3D display using a barrier has very poor luminous efficiency. In order to perform bright display, a light source such as an LED needs to strongly emit light, which increases power consumption. On the other hand, in an embodiment, because light is condensed by each first lens device 41 even when the shielding plate 82 is used, a light condensing point may be narrower than an opening width.

Accordingly, luminous efficiency may be improved and power consumption may be reduced.

Embodiment 5

Next, Embodiment 5 will be described. In the present embodiment, the second lens element 31 in the cylindrical lens array 30 may be misaligned.

Figure 28:
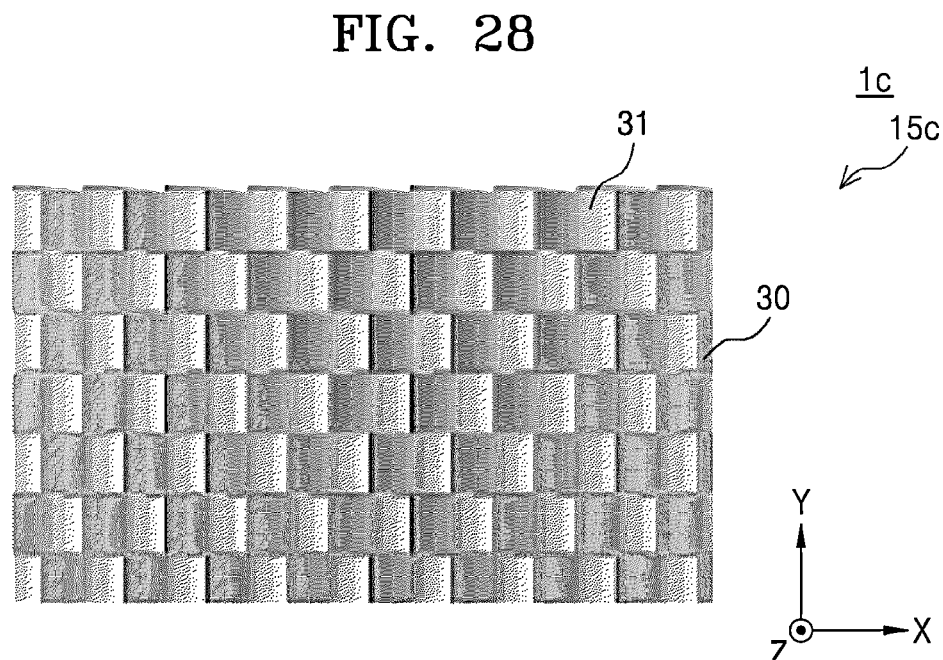
FIG. 28 is a top view illustrating an arrangement of a second lens element in a cylindrical lens array, in a 3D display device, according to an embodiment.
Figure 29:
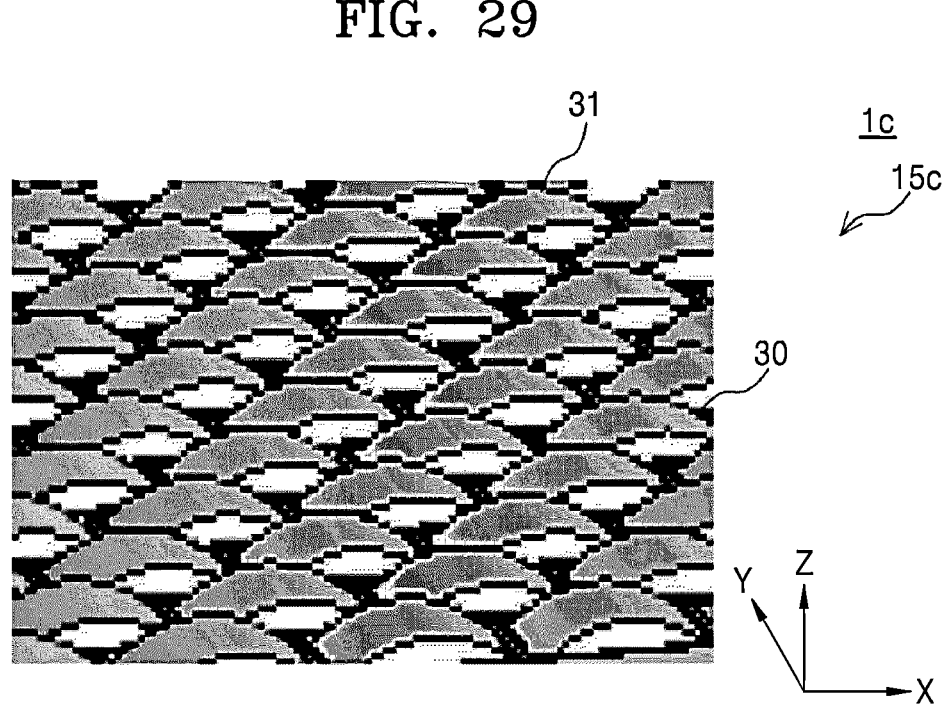
FIG. 29 is a perspective view illustrating an arrangement of a second lens element in a cylindrical lens array, in a 3D display device, according to an embodiment.

FIG. 28 is a top view illustrating an arrangement of the second lens element 31 in the cylindrical lens array 30, in a 3D display device 1c according to Embodiment 5. FIG. 29 is a perspective view illustrating an arrangement of the second lens element 31 in the cylindrical lens array 30, in the 3D display device 1c according to Embodiment 5. FIG. 30 is a top view illustrating the cylindrical lens array 30 seen through the diffusion sheet 81, in the 3D display device 1c according to Embodiment 5.

As shown in FIGS. 28 and 29, a light source controller 15c of the present embodiment includes the cylindrical lens array 30 including a plurality of second lens elements 31 arranged to be misaligned. That is, in the cylindrical lens array 30, the plurality of second lens elements 31 are arranged to be misaligned in the X-axis direction and the Y-axis direction. For example, each second lens element 31 in a column in which a plurality of second lens elements 31 are arranged in the X-axis direction is shifted by half a pitch with respect to each second lens element 31 in an adjacent column in the Y-axis direction.

When the cylindrical lens array 30 is viewed from the +Z-axis direction, the amount of light at a ridge portion of the second lens element 31 is different from the amount of light at an end portion. Accordingly, the in-plane uniformity of the amount of light transmitted through the cylindrical lens array 30 is reduced. However, as shown in FIG. 30, the in-plane uniformity of the amount of light transmitted through the cylindrical lens array 30 may be improved by passing through the diffusion sheet 81. As such, the 3D display device 1c of an embodiment diffuses light in horizontal and vertical directions by using the diffusion sheet 81 and illuminates the display unit 10. In addition, because the plurality of second lens elements 31 are misaligned and the diffusion sheet 81 is used to compensate for the lack of light at an end portion of the second lens element 31 with the amount of light at a ridge portion of the second lens element 31, in-plane uniformity may be improved.

According to an embodiment, because light emitted from each linear light source 51 of the light source unit 50 passes through the cylindrical lens array 30, the lenticular sheet 40, and the diffusion sheet 81, a display range may be wider than a viewing angle of the lenticular sheet 40. Also, because light emitted from the plurality of linear light sources 51 with a wider emission width than each linear light source 51 of the light source unit 50 passes through the above configuration, high-definition display may be performed. Accordingly, 3D display with high definition and depth may be performed by dividing light emission of the light source unit 50 into fields and optimizing display content.

Embodiment 6

Next, Embodiment 6 will be described. In the present embodiment, display is performed in two fields: a depth of field and a high-definition field.

FIG. 31 is a view illustrating 2-field display of a depth of field and a high-definition field, in a 3D display device 12d according to Embodiment 6. As shown in FIG. 31, in a direction where an observation angle is 0° and a direction where an observation angle is 60°, the 3D display device 1d switches and displays depth display for displaying a depth of field and 2D display for displaying a high-definition field on the display unit 10. Because the 3D display device 1d of an embodiment includes the diffusion sheet 81, depth display may be 3D display of a wide viewing zone.

Figure 32:
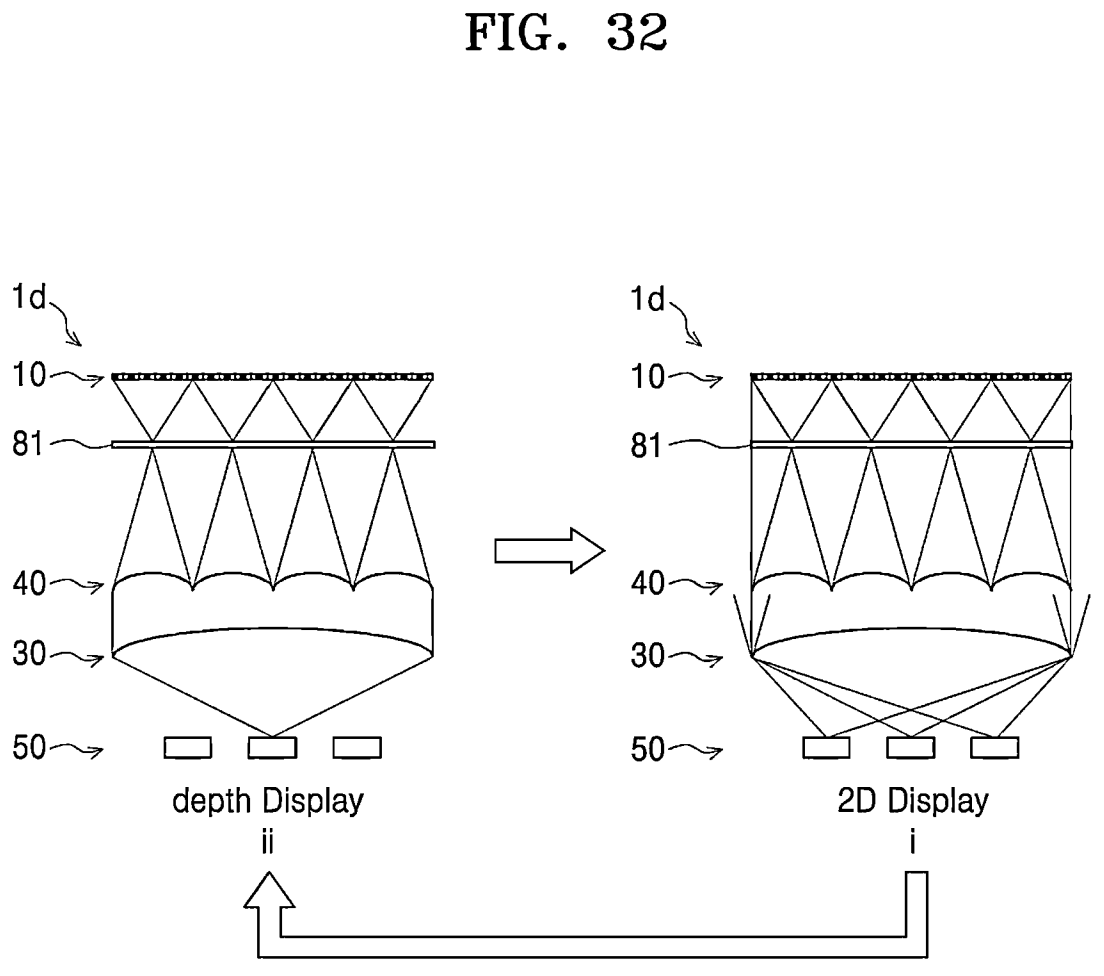

FIG. 32 is a view illustrating field control including a depth of field and a high-definition field, in the 3D display device 1d according to Embodiment 6. As shown in FIG. 32, the display driving unit 17 switches a first image and a second image according to whether display is depth display or 2D display and displays them on the display unit 10. The light source driving unit 19 switches the number of linear light sources 51 that are turned on, at a timing when display is switched between depth display and 2D display. Also, when switching from 2D display to depth display, the light source driving unit 19 turns on the linear light source 51 according to a display angle range corresponding to a field after switching.

As shown in (i) of FIG. 32, light diffused by the diffusion sheet 81 by simultaneously turning on the linear light sources 51 of the light source unit 50 in a plurality of directions illustrates the display unit 10 in a uniform pattern. Accordingly, the 2D display device 1d may be in a so-called 2D display state. The 2D display has no parallax and may be displayed with high definition.

Also, as shown in (ii) of FIG. 32, the 3D display device 1d illuminates the display unit 10 with the linear light source 51 according to a display angle range corresponding to a field. Accordingly, the 3D display device 1d may be in a so-called depth display state. The depth display may be 3D display of a wide viewing zone. As such, the 3D display device 1d of an embodiment repeatedly performs display in two fields: a field for performing depth display of a 3D image and a field of performing high-definition 2D display. Because an image displayed in a high-definition field may be observed from all angles, the luminance observed by a user may be improved when the high-definition field is combined with a depth of field. Also, the combination of a high-definition field and a depth of field also is also advantageous in terms of a refresh rate.

The 3D display device 1d of an embodiment includes a plurality of light source units 50 as described above. Each light source unit 50 includes a plurality of linear light sources 51. The light source driving unit 19 drives the plurality of light source units 50 so that the number of linear light sources 51 used to illuminate a second image (2D display) from among the linear light sources 51 included in each of the plurality of light source units 50 is greater than the number of linear light sources 51 used to illuminate a first image (depth display).

Also, the display driving unit 17 displays a first image and a second image through field division on the display unit 10. Also, as a field is switched, the light source driving unit 19 turns on the linear light source 51 according to an angle range corresponding to a first image after switching. Each of the plurality of linear light sources 51 includes the light source block BL arranged along a vertical scanning direction of the display unit 10. The display driving unit 17 switches an image displayed on the display unit 10 in a cycle of vertical scanning. The light source driving unit 19 turns on or turns off the light source block BL included in the linear light source 51 toward the vertical scanning direction. The synchronization unit 18 synchronizes a position of vertical scanning of the display unit 10 with a vertical position of the light source block BL that is turned on or turned off.

Although embodiments of an embodiment have been described, an embodiment is not limited to Embodiments 1 to 6 and modified examples, and may be appropriately changed without departing from the purpose. For example, configurations of Embodiments 1 to 6 and modified examples may be appropriately combined. Also, when combined, each configuration may be changed without departing from the purpose.

A 3D display device according to an embodiment may include a display unit configured to display an image.

The 3D display device according to an embodiment may include a display driving unit configured to display, on the display unit, a plurality of first images for allowing a viewer to recognize a depth component of the image and a second image for allowing the viewer to recognize a planar component of the image.

The 3D display device according to an embodiment may include a first lens array including a plurality of first lens elements arranged at a certain pitch on a rear side of the display unit.

The 3D display device according to an embodiment may include a second lens array including a plurality of second lens elements arranged at a wider pitch than the certain pitch of the plurality of first lens elements on a rear side of the first lens array.

The 3D display device according to an embodiment may include a plurality of light source units respectively located on rear sides of the plurality of second lens elements and each including a plurality of light sources.

The 3D display device according to an embodiment may include a light source driving unit configured to control the plurality of light source units to illuminate the plurality of first images and the second image.

The display unit according to an embodiment may be located at a position that is greater than or equal to 1.9 times and less than 2.1 times a focal length of the first lens array from the first lens array.

Each of the plurality of light source units according to an embodiment may include a first light source located in a vertical direction of a pixel array included in the display unit.

Each of the plurality of light source units according to an embodiment may include a second light source and a third light source spaced apart from each other with the first light source therebetween.

Each of the first to third light sources according to an embodiment may be radially adjacent at a certain distance from a principal point of a corresponding second lens element of the second lens array.

Each of the first to third light sources according to an embodiment may be a linear light source extending along a vertical direction of a pixel array included in the display unit.

The light source driving unit according to an embodiment may be configured to drive the plurality of light source units so that a number of light sources used to illuminate the second image from among light sources included in each of the plurality of light source units is greater than a number of light sources used to illuminate one of the plurality of first images.

Each of the plurality of first images according to an embodiment may have a different angle range in a display direction of the image.

Each of the plurality of light sources according to an embodiment may be located at a different position corresponding to the angle range.

The display driving unit according to an embodiment may be configured to display the plurality of first images through field division.

The light source driving unit according to an embodiment may be configured to, as a field is switched, turn on a light source according to an angle range corresponding to a first image after switching.

Each of the plurality of light sources according to an embodiment may include a light source block arranged along a vertical scanning direction of the display unit.

The display driving unit according to an embodiment may be configured to switch a first image displayed on the display unit in a cycle of vertical scanning.

The light source driving unit according to an embodiment may be configured to turn on or turn off the light source block included in the light source toward the vertical scanning direction.

The display driving unit according to an embodiment may include a synchronization unit configured to synchronize a position of the vertical scanning of the display unit with a vertical position of the light source block that is turned on or turned off.

The display driving unit according to an embodiment may be configured to display the plurality of first images and the second image on the display unit through area division.

The display driving unit according to an embodiment may be configured to display a first image corresponding to each angle range through field division, in an area where the plurality of first images are displayed.

The light source driving unit according to an embodiment may be configured to drive the plurality of light source units through area control so that a number of light sources used to illuminate the second image from among light sources included in each of the plurality of light source units is greater than a number of light sources used to illuminate one of the plurality of first images.

The 3D display device according to an embodiment may include an image generating unit configured to generate the plurality of first images and the second image.

For a depth area that is an image area that is included in a multi-view image obtained by photographing a subject from a plurality of different viewpoints and has parallax greater than a certain threshold value, the image generating unit according to an embodiment may generate the plurality of first images by sampling the multi-view image.

For a high-definition area that is an image area included in the multi-view image and having parallax equal to or less than the certain threshold value, the image generating unit according to an embodiment may generate, as the second image, an image obtained by photographing the subject at a certain viewpoint.

For a depth area that is an image area that is included in a multi-view image obtained by photographing a subject from a plurality of different viewpoints and has parallax greater than a threshold value, the image generating unit according to an embodiment may generate a low-frequency component of an element image generated by sampling the multi-view image as the second image of the depth area.

The image generating unit according to an embodiment may generate the plurality of first images of the depth area by subtracting the second image of the depth area from the element image.

For a high-definition area that is an image area included in the multi-view image and having parallax equal to or less than the threshold value, the image generating unit according to an embodiment may generate a low-frequency component obtained by sampling an image obtained by photographing the subject from a certain viewpoint at a pitch of the first lens element as the first image of the high-definition area.

The image generating unit according to an embodiment may generate the second image of the high-definition area by subtracting the first image of the high-definition area from an image obtained by photographing the subject at the certain viewpoint and sampled at a display resolution of the display unit.

The display driving unit according to an embodiment may be configured to display the plurality of first images in a plurality of fields and display the second image in one field.

Ridges of the second lens array according to an embodiment may be arranged along a vertical direction of a pixel array of the display unit.

Ridges of the first lens array according to an embodiment may be arranged to be inclined at a certain angle with respect to the vertical direction.

The 3D display device according to an embodiment may further include a diffusion sheet located between the first lens array and the display unit and configured to diffuse incident light.

The diffusion sheet according to an embodiment may be located at a position that is 0.9 times to 1.1 times a focal length of the first lens array from the first lens array.

The diffusion sheet according to an embodiment may be an anisotropic diffusion sheet configured to diffuse the incident light more strongly in a ridge direction of the first lens array than in a direction perpendicular to ridges of the first lens array.

Each of the plurality of light source units according to an embodiment may further include a light blocking wall configured to inhibit incidence of light from an adjacent light source unit to a corresponding second lens element.

The 3D display device according to an embodiment may further include a shielding plate located on a surface of the first lens array and including a slit that shields light transmitted through a peripheral portion of each first lens element and transmits light transmitted through a central portion of each first lens element.

The plurality of second lens elements according to an embodiment may be arranged to be misaligned in a vertical direction and a horizontal direction of a pixel array of the display unit.

The above-described embodiments are merely specific examples to describe technical content according to the embodiments of the disclosure and help the understanding of the embodiments of the disclosure, not intended to limit the scope of the embodiments of the disclosure. Accordingly, the scope of various embodiments of the disclosure should be interpreted as encompassing all modifications or variations derived based on the technical spirit of various embodiments of the disclosure in addition to the embodiments disclosed herein.

What is claimed is:

1. A three-dimensional (3D) display device comprising:
a display unit configured to display an image, the image comprising a first area, and a second area different from the first area;
a display driver configured to display, on the display unit, a plurality of first images at the first area based on a depth component of the image and a second image at the second area based on a planar component of the image;
a first lens array comprising a plurality of first lens elements provided at a first pitch on a rear side of the display unit;

a second lens array comprising a plurality of second lens elements provided at a second pitch wider than the first pitch of the plurality of first lens elements on a rear side of the first lens array;
a plurality of light source assemblies, each light source assembly of the plurality of light source assemblies being located on a rear side of a corresponding second lens element of the plurality of second lens elements and comprising a plurality of light sources;
a light source driver configured to control the plurality of light source assemblies to illuminate the plurality of first images and the second image; and
a diffusion sheet between the first lens array and the display unit and configured to diffuse incident light,
wherein the plurality of light sources of each light source assembly are radially adjacent at a first distance from a principal point of the corresponding second lens element,
wherein, based on the light source driver driving the plurality of light source assemblies, a number of light sources, among the plurality of light sources of each light source assembly, used to illuminate the second image is greater than a number of light sources used to illuminate one of the plurality of first images,
wherein a position of the diffusion sheet is 0.9 times to 1.1 times a focal length of the first lens array from the first lens array, and
wherein the first lens array further comprises ridges and the diffusion sheet is an anisotropic diffusion sheet configured to diffuse more incident light in a direction of the ridges of the first lens array than in a direction perpendicular to the direction of the ridges of the first lens array.

2. The 3D display device of claim 1, wherein a position of the display unit is greater than or equal to 1.9 times and less than 2.1 times the focal length of the first lens array from the first lens array.

3. The 3D display device of claim 1, wherein at least one light source assembly of the plurality of light source assemblies comprises:
a first light source provided in a vertical direction of a pixel array included in the display unit; and
a second light source and a third light source spaced apart from each other with the first light source therebetween.

4. The 3D display device of claim 3, wherein the first light source, the second light source, and the third light source are radially adjacent at the first distance from the principal point of the corresponding second lens element of the second lens array.

5. The 3D display device of claim 1, wherein at least some of the plurality of first images have a different angle range in a display direction, and
wherein at least some of the plurality of light sources are provided at different positions corresponding to the angle range.

6. The 3D display device of claim 5, wherein the display driver is configured to display the plurality of first images through field division, and
wherein, based on a field of a first image being switched, the light source driver is configured to turn on a light source according to an angle range corresponding to the first image after the field is switched.

7. The 3D display device of claim 6, wherein at least some of the plurality of light sources comprise a light source block along a vertical scanning direction of the display unit, wherein the display driver is configured to switch the first image displayed on the display unit in a process of vertical scanning, wherein the light source driver is configured to turn on and turn off the light source block included in the at least some of the plurality of light sources in the vertical scanning direction, and wherein the display driver comprises a synchronization module configured to synchronize a position of the vertical scanning of the display unit with a vertical position of the light source block that is turned on or turned off.

8. The 3D display device of claim 6, wherein the display driver is configured to display the plurality of first images and the second image on the display unit through area division, and display the first image corresponding to each angle range through the field division, in an area in which the plurality of first images are displayed, and wherein, based on the light source driver driving the plurality of light source assemblies through area control, the number of light sources, among the plurality of light sources included in the plurality of light source assemblies, used to illuminate the second image is greater than the number of light sources used to illuminate the one of the plurality of first images.

9. The 3D display device of claim 1, wherein the display driver is configured to display the plurality of first images in a plurality of fields and display the second image in one field.

10. The 3D display device of claim 1, wherein the second lens array further comprises ridges along a vertical direction of a pixel array of the display unit, and wherein the ridges of the first lens array are inclined at a predetermined angle with respect to the vertical direction.

11. The 3D display device of claim 1, wherein at least some of the plurality of light source assemblies comprise a light blocking wall configured to inhibit incidence of light from an adjacent light source assembly to the corresponding second lens element.

12. The 3D display device of claim 1, further comprising a shielding plate provided on a surface of the first lens array and comprising a slit configured to shield light transmitted through a peripheral portion of each first lens element included in the first lens array and transmit light through a central portion of the each first lens element.

* * * * *